United States Patent
Gatson et al.

(10) Patent No.: US 10,234,926 B2
(45) Date of Patent: Mar. 19, 2019

(54) METHOD AND APPARATUS FOR CUSTOMIZED ENERGY POLICY BASED ON ENERGY DEMAND ESTIMATION FOR CLIENT SYSTEMS

(71) Applicant: Dell Products, LP, Round Rock, TX (US)

(72) Inventors: Michael S. Gatson, Austin, TX (US); Joseph Kozlowski, Hutto, TX (US); Yuan-Chang Lo, Austin, TX (US); Nikhil M. Vichare, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 328 days.

(21) Appl. No.: 14/741,125

(22) Filed: Jun. 16, 2015

(65) Prior Publication Data

US 2016/0370843 A1    Dec. 22, 2016

(51) Int. Cl.
| G06F 1/32 | (2006.01) |
|---|---|
| G06F 1/3234 | (2019.01) |
| G06F 1/3203 | (2019.01) |
| G06F 1/3206 | (2019.01) |
| G06F 1/3287 | (2019.01) |

(52) U.S. Cl.
CPC .......... *G06F 1/3234* (2013.01); *G06F 1/3203* (2013.01); *G06F 1/3206* (2013.01); *G06F 1/3287* (2013.01); *Y02D 10/171* (2018.01)

(58) Field of Classification Search
CPC ..... G06F 1/3206; G06F 1/3287; G06F 1/3203
See application file for complete search history.

(56) References Cited

U.S. PATENT DOCUMENTS

| 7,689,850 | B2 | 3/2010 | Cantwell et al. |
|---|---|---|---|
| 7,706,928 | B1 | 4/2010 | Howell et al. |
| 7,873,485 | B2 | 1/2011 | Castelli et al. |
| 8,230,245 | B2 | 7/2012 | Khatri et al. |
| 8,799,695 | B2 | 8/2014 | Belt et al. |
| 2007/0067656 | A1* | 3/2007 | Ranganathan ........ G06F 1/3203 713/320 |
| 2008/0059643 | A1 | 3/2008 | Moss |
| 2008/0271113 | A1 | 10/2008 | Belling |
| 2009/0157333 | A1 | 6/2009 | Corrado et al. |
| 2011/0144818 | A1* | 6/2011 | Li ........................ G06F 1/3203 700/291 |
| 2012/0117399 | A1 | 5/2012 | Chan |
| 2012/0154171 | A1 | 6/2012 | Hurri et al. |

(Continued)

OTHER PUBLICATIONS

Non-Final Office Action dated Dec. 14, 2016 in copending U.S. Appl. No. 14/737,326.

*Primary Examiner* — Jaweed A Abbaszadeh
*Assistant Examiner* — Alyaa T Mazyad
(74) *Attorney, Agent, or Firm* — Prol Intellectual Property Law, PLLC; H. Kenneth Prol

(57) ABSTRACT

An information handling system includes an application processor that executes instructions of an intelligent energy management system that determines energy demand estimation based on component device utilization data from a group of client information handling systems. The information handling system includes a power policy engine that determines a timeseries power cost estimation based on the energy demand estimation, day and time of energy usage, and energy rate for the time and location.

20 Claims, 16 Drawing Sheets

(56) References Cited

U.S. PATENT DOCUMENTS

| | | | |
|---|---|---|---|
| 2012/0185706 A1* | 7/2012 | Sistla | G06F 1/3203 713/300 |
| 2013/0046967 A1* | 2/2013 | Fullerton | H03K 3/0315 713/100 |
| 2013/0294291 A1 | 11/2013 | Rasanen | |
| 2013/0326250 A1* | 12/2013 | Sullivan | G06F 1/3206 713/323 |
| 2014/0075222 A1 | 3/2014 | Jackson | |

* cited by examiner

METHOD AND APPARATUS FOR CUSTOMIZED ENERGY POLICY BASED ON ENERGY DEMAND ESTIMATION FOR CLIENT SYSTEMS

CROSS REFERENCE TO RELATED APPLICATIONS

Related subject matter is contained in co-pending U.S. patent application Ser. No. 14/737,326 entitled "Method and Apparatus for Demand Estimation for Energy Management of Client Systems," filed on Jun. 11, 2015, the disclosure of which is hereby incorporated by reference.

FIELD OF THE DISCLOSURE

This disclosure generally relates to information handling systems, and more particularly relates to a method and apparatus for demand estimation for energy management of client systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, entertainment, or other purposes. For example, an information handling system may be a personal computer (e.g., desktop or laptop), tablet computer, mobile device (e.g., personal digital assistant (PDA) or smart phone), server (e.g., blade server or rack server), a network server or storage device, a switch router, wireless router, or other network communication device, a network connected device, or any other suitable device and may vary in size, shape, performance, functionality, and price. The information handling system can also be implemented as or incorporated into various devices, such as a laptop computer, a tablet computer, a set-top box (STB), a mobile information handling system, a palmtop computer, a desktop computer, a communications device, a control system, a camera, a scanner, a facsimile machine, a printer, a pager, a web appliance, a network router, switch or bridge, or other computing device. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

Figure 1:
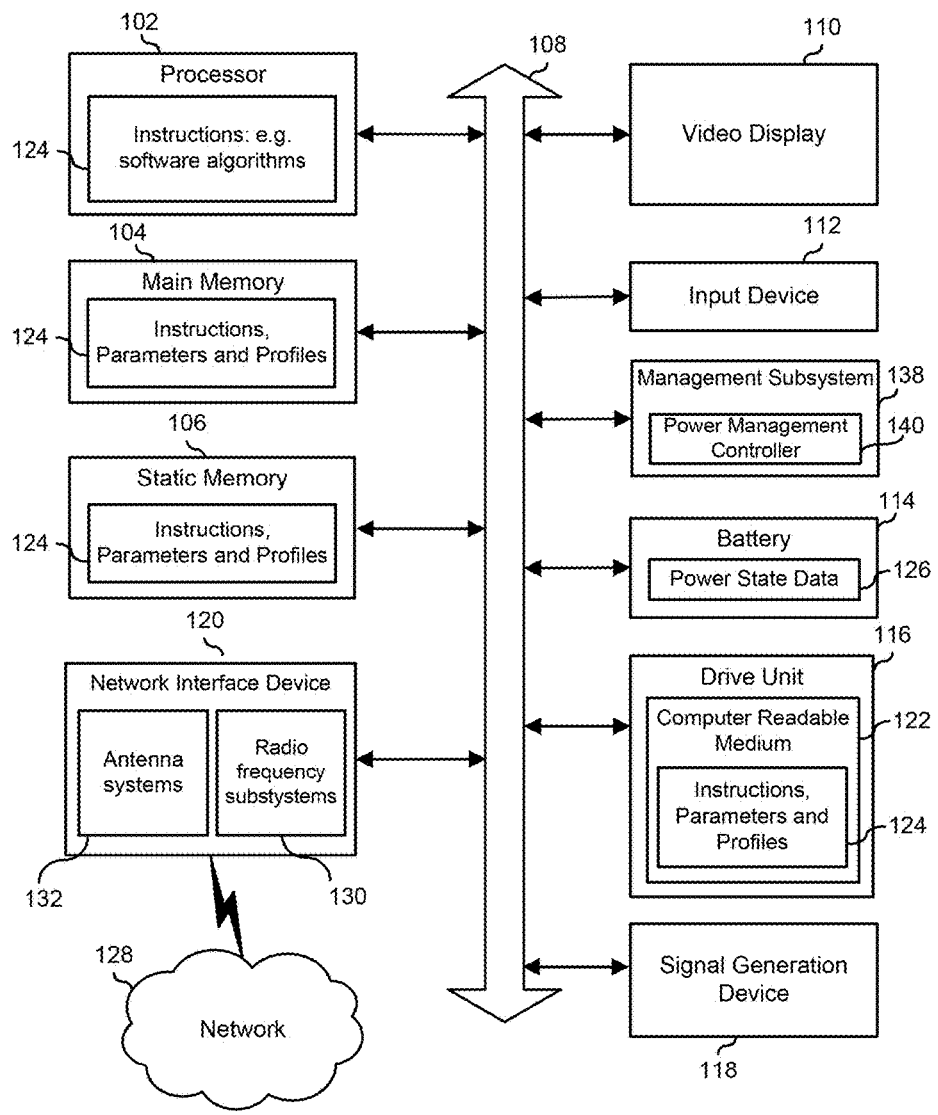
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Energy consumption considerations are relevant for both cost and environmental reasons with respect to operation of information handling systems. Cost and environmental concerns can scale up to become a very substantial issue for a group of information handling systems operating under IT management of an organization such as an enterprise. Power savings policies may be implemented regarding information handling system power consumption. Accurate estimation of power consumption within the group or enterprise becomes valuable for IT management and budgeting. This may be necessary for estimations of energy costs during infrastructure management. Information technology managers of an organization or enterprise may be further acutely aware of power consumption needs for a plurality of information handling systems with respect to environmental efficiency considerations.

Power savings policies may be strategically implemented in various forms with better power demand estimation and more specific estimations. Power savings policies may include, for example, display dimming, display power down, various levels of sleep mode, processor throttling for any of the system or graphics processors, throttling of network interface or wireless function where available, among other power savings policies at individual client information handling systems. Other examples of power saving policies may include implementation of system power states for global system function, processor states for central processors or other processors, device states for specific component devices in information handling systems, or performance states throttling performance of component devices or processors. An example of capability to implement such states includes the Advanced Configuration and Power Interface (ACPI) standards implemented via ACPI tables, BIOS, and registers. Another example is ACPI Component Architecture (ACPICA). Currently, power demand estimation engines view macro energy consumption budgets on simple assumptions such as the number of systems, hours of operation, days of operation, price of energy, etc. Improved power demand estimation for one or more information handling systems may assist in optimizing utilization and power saving policy settings.

An intelligent energy management system may access system status monitoring data related to a hardware implementation monitoring system that monitors and stores data relating to usage of component devices and systems in client information handling systems. The hardware implementation monitoring system may operate in the background during operation of the information handling system. Component device utilization data may be collected via numerous source information handling systems, and relate to operation of numerous hardware functions of each client information handling system. Component device utilization data may be retrieved from a variety of sensors including detection of power consumption and activity levels of component devices within client information handling systems. Power draw measurements may be conducted on power rails supplying power to individual component devices in the client information handling system or to component devices externally connected to the information handling systems. Additionally processor activity, controller activity, wireless interface activity, memory/drive activity, and other component activity measurements may also be assessed independently or in connection with power draw measurements. Collected data may be sourced via SMBIOS, Win 32 API, or device drivers to a database repository. An example, hardware implementation monitoring database includes the Dell® Data Vault (DDV) system operational via Windows® or other operating systems. Component device utilization data may be collected and stored on-box locally at a client information handling system, or may be reported remotely to a hub server or servers or a remote data center hosting a DDV or other data repository for a plurality of client information handling systems.

Monitoring is done via network connection and a hardware implementation monitoring system and an intelligent energy management system having a power policy engine. Policy may be implemented on an individualized basis for specific client information handling systems. In other embodiments, power savings policies may be implemented on an enterprise level via feedback of power consumption trends for aspects of information handling systems in the enterprise to enable apportionment of power savings policies. In an embodiment, the determination of power savings polices may account for productivity index ratings to avoid limiting productivity for client information handling systems or for the broader group or enterprise. In an aspect, productivity indices for component devices in client information handling systems may be used to minimize limiting productivity for users of the client information handling systems by targeting component devices with less impact or no impact on a user's productivity. In some embodiments, the selection may not necessarily be optimal with respect to every user's experience but may instead depend on productivity metrics and considerations of operation priorities. In yet other embodiments, sub-groups of enterprise client information handling systems may fall into defined classifications based on many factors, for example productivity index determinations or business factors, and policy applied to classification levels. Power usage at individual information handling systems may therefore be more accurately estimated with component device monitoring and power savings policy optimized. Additionally, power consumption demand estimation across a broader set of information handling systems may more accurately predict estimated energy demand and energy costs. Enterprise wide power policies may also be optimized based on a plurality of factors as described herein.

FIG. 1 illustrates an information handling system 100 similar to information handling systems according to several aspects of the present disclosure. For example, an information handling system 100 may be any mobile or other computing device capable of executing a set of instructions (sequential or otherwise) that specify actions to be taken by that machine. In a particular embodiment, the information handling system 100 can be implemented using electronic devices that provide voice, video, or data communication. Further, while a single information handling system 100 is illustrated, the term "system" shall also be taken to include any collection of systems or sub-systems that individually or jointly execute a set, or multiple sets, of instructions to perform one or more computer functions.

FIG. 1 shows an information handling system 100 capable of administering each of the specific embodiments of the present disclosure. The information handling system 100 can represent the client information handling systems of FIG. 2 such as 220, 221, 222, and 224 or servers or systems such as 210 located anywhere within network 200, including the remote data center 290 operating virtual machine applications as described herein. The information handling system 100 may also execute code for hardware implementation monitoring and reporting system and for an intelligent energy management system that may operate on servers or systems 210, remote data centers 290, or on-box in individual client information handling systems such as 220, 221, 222, and 224 according to various embodiments herein. In other aspects, intelligent energy management system agents may operate on client information handling systems such as 220, 221, 222, and 224 to log and collect data relating to component device utilization and other use metrics. For example, power draw of various component devices within the client information handling systems 220, 221, 222, and 224 may be measured and logged in a hardware implementation monitoring system data repository such as a Dell® Data Vault by the intelligent energy management agent operating on the client information handling system. In some aspects, this component device utilization data may be reported back to a hub server or remote data center operating the intelligent energy management system in accordance with the disclosure herein. In other aspects, some or all of the intelligent energy management system may operate on-box at the client information handling system to conduct power estimation and other operations.

The information handling system 100 may include a processor 102 such as a central processing unit (CPU), a graphics processing unit (GPU), control logic or some combination of the same. Any of the processing resources may operate to execute code that is either firmware or software code. Moreover, the information handling system 100 can include memory such as main memory 104, static memory 106, and drive unit 116 (volatile (e.g. random-access memory, etc.), nonvolatile (read-only memory, flash memory etc.) or any combination thereof). Additional components of the information handling system can include one or more storage devices such as static memory 106 and drive unit 116. The information handling system 100 can also include one or more buses 108 operable to transmit communications between the various hardware components such as any combination of various input and output (I/O) devices. Portions of an information handling system may themselves be considered information handling systems.

As shown, the information handling system 100 may further include a video display unit 110, such as a liquid crystal display (LCD), an organic light emitting diode (OLED), a flat panel display, a solid state display, or a cathode ray tube (CRT). Additionally, the information handling system 100 may include an input device 112, such as a keyboard, and a cursor control device, such as a mouse, touchpad, or gesture or touch screen input. The information handling system 100 can also include a signal generation device 118, such as a speaker or remote control. The information handling system 100 can represent a server device whose resources can be shared by multiple client devices, or it can represent an individual client device, such as a desktop personal computer, a laptop computer, a tablet computer, or a mobile phone. In a networked deployment, the information handling system 100 may operate in the capacity of a server or as a client user computer in a server-client user network environment, or as a peer computer system in a peer-to-peer (or distributed) network environment.

The information handling system 100 can include a set of instructions 124 that can be executed to cause the computer system to perform any one or more of the methods or computer based functions disclosed herein. For example, information handling system 100 includes one or more application programs 124, and Basic Input/Output System and Firmware (BIOS/FW) code 124. BIOS/FW code 124 functions to initialize information handling system 100 on power up, to launch an operating system, and to manage input and output interactions between the operating system and the other elements of information handling system 100. In a particular embodiment, BIOS/FW code 124 reside in memory 104, and include machine-executable code that is executed by processor 102 to perform various functions of information handling system 100. In another embodiment (not illustrated), application programs and BIOS/FW code reside in another storage medium of information handling system 100. For example, application programs and BIOS/FW code can reside in static memory 106, drive 116, in a ROM (not illustrated) associated with information handling system 100 or other memory. Other options include application programs and BIOS/FW code sourced from remote locations, for example via a hypervisor or other system, that may be associated with various devices of information handling system 100 partially in memory 104, storage system 106, drive 116 or in a storage system (not illustrated) associated with network channel 120 or any combination thereof. Application programs 124 and BIOS/FW code 124 can each be implemented as single programs, or as separate programs carrying out the various features as described herein. Application program interfaces (APIs) such Win 32 API may enable application programs 124 to interact or integrate operations with one another.

In an example of the present disclosure, instructions 124 may execute the intelligent energy management system disclosed herein. Additionally, instructions 124 may execute the hardware implementation monitoring system disclosed herein and an API may enable interaction between these application programs and device drivers and other aspects of the information handling system and software instructions 124 thereon. In a further example, processor 102 may conduct processing of component device power utilization data by the information handling system 100 according to the systems and methods disclosed herein. The computer system 100 may operate as a standalone device or may be connected, such as via a network, to other computer systems or peripheral devices.

Main memory 104 may contain computer-readable medium (not shown), such as RAM in an example embodiment. Static memory 106 may contain computer-readable medium (not shown), such as NOR or NAND flash memory in some example embodiments. The disk drive unit 116 may include a computer-readable medium 122 such as a magnetic disk in an example embodiment. The computer-readable medium of the memory and storage devices 104, 106, and 116 may store one or more sets of instructions 124 such as software code corresponding to the present disclosure.

The disk drive unit 116, and static memory 106, also contains space for data storage such as a hardware implementation monitoring system data. Gathered component device utilization data may also be stored in part or in full in data storage 106 or 116 which may serve as some or all of a component device utilization data repository. Further, the instructions 124 may embody one or more of the methods or logic as described herein. For example, instructions relating to the hardware implementation monitoring system, the intelligent energy management system software algorithms, or the intelligent energy management agent may be stored here.

In a particular embodiment, the instructions, parameters, and profiles 124 may reside completely, or at least partially, within the main memory 104, the static memory 106, disk drive 116 and/or within the processor 102 during execution by the information handling system 100. Additionally, power policy settings, and energy demand estimation profiles and other aspects relating to the intelligent energy management system functions may be stored in disk drive 116 or static memory 106. Energy demand estimation profiles may be statistical models of power consumption, power demand estimations, and productivity index determinations performed by an intelligent energy management system in some embodiments. Parameters may include aspects of component data utilization data to be analyzed with the intelligent energy management system. Energy policy requirements may be set by an administrator such as an IT department of an enterprise or be automatically triggered based on power demand estimations and productivity determinations. Component device utilization data in storage may also include data such as power draw data measured by the processor 102 for specific component devices or systems during information handling system operation. In some aspects, intelligent energy management system parameters may include business factor determinations of enterprise critical applications or high importance information handling systems which may impact productivity index determinations or power policy implementations. Such profile business factors may govern parameters and policy around energy demand estimations.

The information handling system may include a power source such as battery 114 or an A/C power source. The information handling system may also have a management subsystem 138 with a plurality of information handling system subsystems for control of a plurality of systems. For example, the power and battery resource available to the information handling system may be managed or controlled by a power management controller 140 such as power management unit or battery management unit that may access battery power state data 126. In some aspects, power draw measurements may be conducted with control and monitoring of power supply via the power management control system 140. In other aspects, power draw data may also be monitored with respect to component devices of the information handling system. In some aspects where applicable, execution of power policy may be administered partially via the power management control system 140. Battery 114 may include a smart battery system that tracks and provides power state data 126. This power state data 126 may be stored with the instructions, parameters, and profiles 124 such as component device utilization data to be used with the systems and methods disclosed herein.

The information handling system 100 can also include a network interface device 120 that may be wired network adapter or may be a wireless adapter as shown. Wireless network interface devices will include antenna subsystems 132 and radio frequency control subsystems 130 which may work in connection with the management subsystem 138. As a wireless adapter, network interface device 120 can provide connectivity to a network 128. A wired network interface is also contemplated (not shown). Radio frequency subsystems 130 and antenna subsystems 132 may include transmitter/receiver circuitry, wireless controller circuitry, amplifiers and other circuitry for wireless communications. Each radiofrequency subsystem 130 may communicate with one or more wireless technology protocols.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Figure 2:
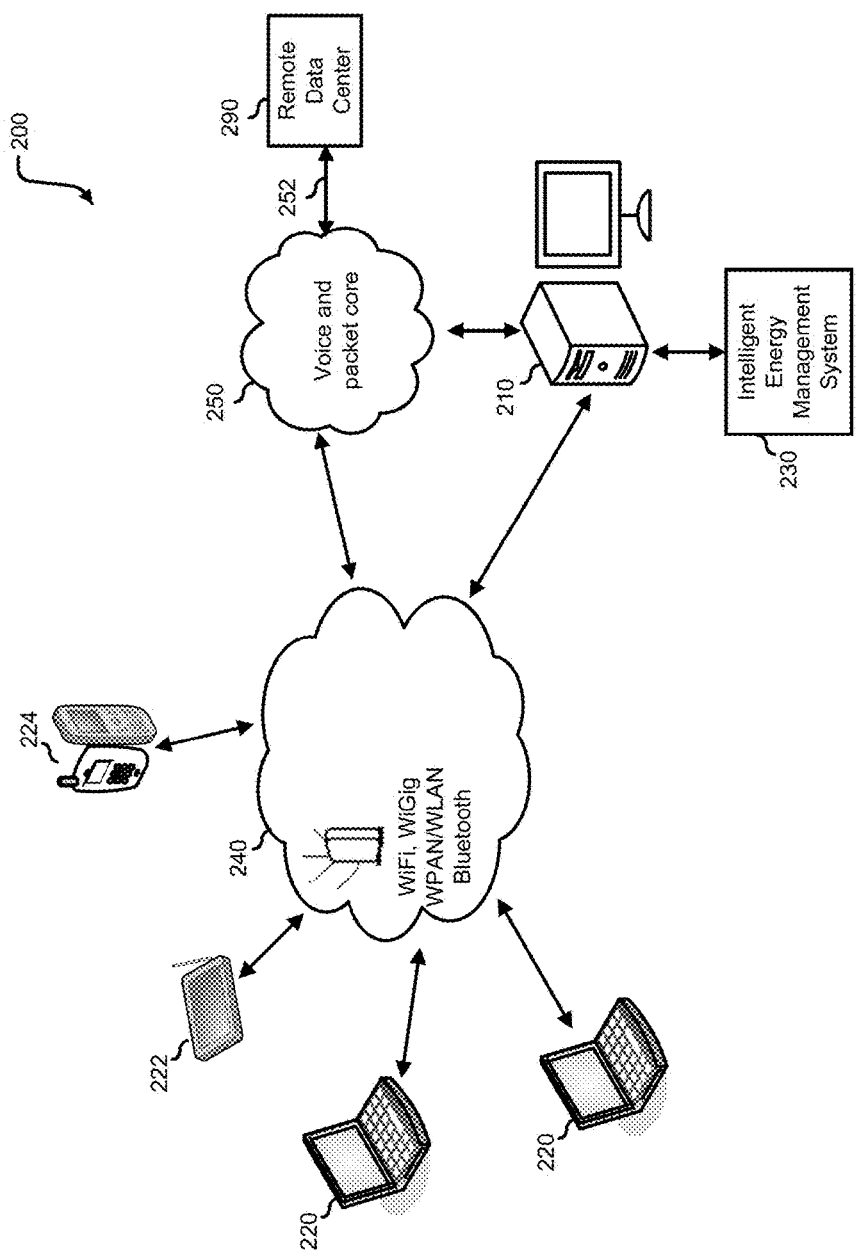
FIG. 2 is a block diagram of a network environment having a plurality of information handling systems according to an embodiment of the present disclosure.

FIG. 2 illustrates a network 200 that can include one or more information handling systems. In a particular embodiment, network 200 includes networked information handling systems 210, 220, 221, 222, and 224, wireless network access points, routers and switches, and multiple wireless connection link options. Systems 210, 220, 221, 222, and 224 represent a variety of computing resources of network 200 including client mobile information handling systems, data processing servers, network storage devices, local and wide area networks, or other resources as needed or desired. In some embodiments, some or all of network 200 may be under control of IT management for a group or enterprise. As specifically depicted, systems 220, 221, 222, and 224 may be a laptop computer, tablet computer, or smartphone device in certain aspects. These user mobile information handling systems 220, 221, 222, and 224, may access a wireless local area network 240, or they may access a macro-cellular network. For example, the wireless local area network 240 may be the wireless local area network (WLAN), a wireless personal area network (WPAN), or a wireless wide area network (WWAN). Since WPAN or Wi-Fi Direct Connection and WWAN networks can functionally operate similar to WLANs, they may be considered as wireless local area networks (WLANs) for purposes herein. Components of a WLAN may be connected by wireline or Ethernet connections to a wider external network. For example, wireless network access points may be connected to a wireless network controller and an Ethernet switch. Wireless communications across wireless local area network 240 may be via standard protocols such as IEEE 802.11 Wi-Fi, IEEE 802.11ad WiGig, IEEE 802.15 WPAN or similar wireless network protocols. Alternatively, other available wireless links within network 200 may include macro-cellular connections. Macro-cellular connections may include 2G standards such as GSM, 2.5G standards such as GSM EDGE and GPRS, 3G standards such as W-CDMA/UMTS and CDMA 2000, or 4G standards such as WiMAX, LTE, and LTE Advanced.

The voice and packet core network 250 may contain externally accessible computing resources and connect to a remote data center 290. The voice and packet core network 250 may contain multiple intermediate web servers or other locations with accessible data (not shown). Connection between the wireless network 240 and remote data center 290 may be via Ethernet or another similar connection to the world-wide-web, a WAN, a LAN, another WLAN, or other network structure. Such a connection via WLAN access point/Ethernet switch to the external network may be a backhaul connection. The wireless access point may be connected to one or more wireless access points in the WLAN before connecting directly to a mobile information handling system or may connect directly to one or more information handling systems 210, 220, 221, 222, and 224.

Remote data center 290 may include web servers or resources within a cloud environment. For example, remote data centers can include additional information handling systems, data processing servers, network storage devices, local and wide area networks, or other resources as needed or desired. Having such remote capabilities may permit fewer resources to be maintained at the client mobile information handling systems 220, 221, 222, and 224 allowing streamlining and efficiency within those devices. Similarly, remote data center 290 permits fewer resources to be maintained in other parts of network 200.

In an example embodiment, the cloud or remote data center 290 may run hosted applications for systems 210, 220, 221, 222, and 224. This may occur by establishing a virtual machine application executing software to manage applications hosted at the remote data center 290. Mobile information handling systems 220, 221, 222, and 224 are adapted to run one or more applications locally, and to have hosted applications run in association with the local applications at remote data center 290 or applications running on another remote information handling systems such as 210. The virtual machine application may serve one or more applications to each of the network connected information handling systems including 210 and client information handling systems 220, 221, 222, and 224. Thus, as illustrated, systems 220, 221, 222, and 224 may be running applications locally while requesting data objects or submitting data objects related to those applications from or to the remote data center 290 and host information handling system 210 via the wireless network. Similarly, system 210 may be running applications locally while requesting data objects or submitting data objects related to those applications from or to the remote data center 290 and receiving or submitting data objects to client information handling systems 220, 221, 222, and 224 via wireless network 240 or voice and packet core 250. For example, a Dell® Data Vault hardware implementation monitoring and reporting application may run locally at systems 220, 221, 222, and 224 and report data back to a host server system 210. In an embodiment, data may then be stored locally, at host system 210, or at a remote data center 290 relating to system status for client information handling systems 220, 221, 222, and 224.

Figure 3:
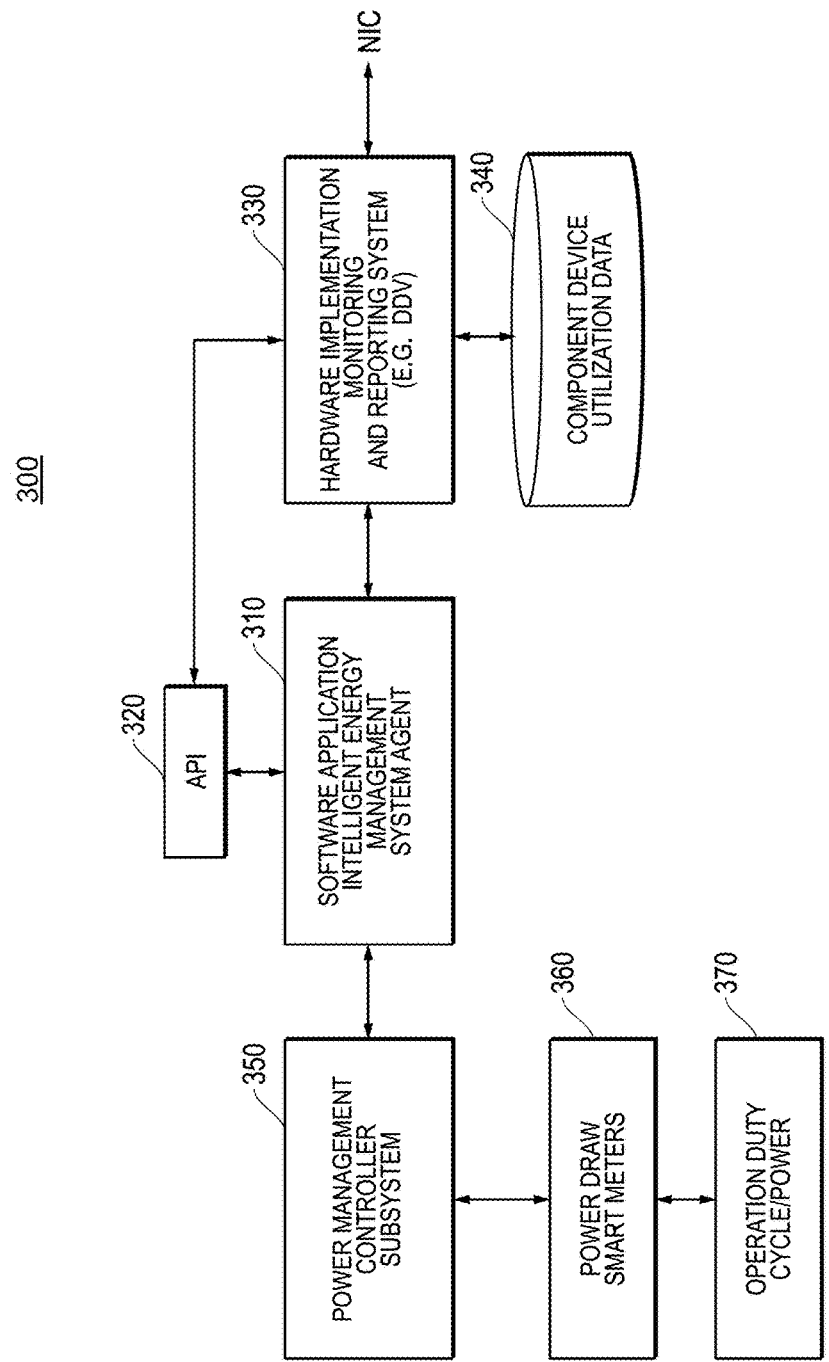
FIG. 3 is a block diagram of components for an aspect of an intelligent energy management system according to an embodiment of the present disclosure.

FIG. 3 illustrates a system block diagram of an aspect of an intelligent energy management system 300 in operation on a client information handling system. The client information handling system of FIG. 3 may execute code to operate an intelligent energy management system agent 310 that coordinates collection of component device utilization data, such as power draw data for component devices in a client information handling system.

The intelligent energy management system agent 310 may coordinate with a power management controller sub-system 350 to collect component device utilization data for the client information handling system. A power management controller sub-system 350 may include connection to a plurality of smart meter power draw measurement sensors 360 situated to detect power draw from a plurality of component devices and systems in the client information handling system in some embodiments. According to one aspect, power draw meters 360 may detect power on supply rails to components such as the CPU, GPU, or the full chipset. Additional component devices including displays, various controllers, both wired and wireless network interface systems, memory, and disk storage systems may have power draw meters 360 situated to detect power usage on power supply rails to those component devices or similar component devices in the client information handling system.

Peripherals among other remotely connected component devices may have intelligent power draw meters 360 to report power usage by those information handling system components. In some embodiments, operational activity of peripheral devices may be used to estimate power draw data via an operation duty cycle power estimator 370 to assess component device performance levels to estimate power draw for the externally connected component devices for which direct power draw measurement may not be available. In an aspect, power draw meters 360 may monitor power drawn from the client information handling systems however through peripheral connectors such as USB or similar connections. If this power draw measurement for peripherals is not specific to one peripheral, the peripheral component performance levels may be used to provide estimates. Such estimation may be also used for component device power measurements within client information handling systems that may not be outfitted with a complete array of power draw meters for component devices in other aspects of the disclosure.

A hardware implementation monitoring and reporting system 330 may monitor performance levels and activity levels of the various component devices or systems of a client information handling system. Such a system will monitor and collect operational activity data and may even include power draw measurements. Power draw measurement may be coordinated between the hardware implementation monitoring system 330 and the intelligent energy management system 310. For operational activity data collected as part of component device utilization data, data points collected may depend on the component device or system being monitored. For example, a processor or controller such as a CPU, utilization factors such as throughput, latency, availability, service times, throttle, ACPI processor states, thread number, processor queue length or other processing performance or utilization measurements may be taken. In some embodiments, power measurement may take place via the power management controller subsystem 350 at an AC power source or smart battery device. Activity of each of the plurality of component devices is monitored by the hardware implementation monitoring system 330, for example a Dell® Data Vault system. With this information, usage of component devices may be determined by the intelligent energy management system agent 310 according to detected activity of the variety of component devices and systems. This usage determination may assess factors including power draw measurements for those component devices.

The intelligent energy management system 310 may comprise a set of instructions run on CPU or embedded controller in the chipset(s). The intelligent energy management system 310 interfaces with the application programming interface (API) 320 found in the information handling system software to coordinate various software applications including the hardware implementation monitoring and reporting system 330 and monitoring system data repository 340 for storing component device utilization data. The API 320 may further coordinate the intelligent energy management system application agent 310, the monitoring and reporting system 330, power draw meter system 360, component device estimators 370, device drivers of various component devices, and other system performance sensors linked with the hardware implementation monitoring system. The API 320 may also coordinate with the power management controller sub-system 350, such as existing PMU/BMU applications controlling power allocation via a power operating system (Power OS), and also power management controllers in various embodiments. These aspects work together to monitor power usage and other component device utilization measurements in the one or more client information handling systems of a group or enterprise. Power usage and other usage measurements comprise part of the component device utilization data that is reported back to a centralized intelligent energy management system. In some aspects, the centralized intelligent energy management system may coordinate energy usage data across an enterprise or other group of information handling system users. For example, the hardware implementation monitoring and reporting system 330 may report component device utilization data via a network interface (NIC) as shown. The reporting may be ongoing, periodic, or in response to requests for data from the intelligent energy management system operating remotely at a hub server or remote data center. Any method of data reporting to a centralized intelligent energy management system is contemplated. The component device utilization data recorded for client information handling systems is also granular in that it may be broken down by component devices within the client information handling systems. Component device utilization data may also be coordinated with operational measurements to identify trends in operation and productivity of users and client information handling systems as discussed further herein. Other data may be recorded as well. This may include time/date data, global positioning system information, usage of AC power sources versus battery usage, and the like. This data may also be included in component device utilization data as well as identifying information relating to the client information handling systems that are part of the enterprise or group.

In some embodiments, an intelligent energy management system may also operate on-box in one or more client information handling systems. In such an embodiment, the monitoring system data repository 340 having component device utilization data may be utilized by the on-box centralized intelligent energy management system and agent 310 to prepare power demand estimates specific to the client information handling system. In such cases, data from other client information handling systems, such as a similarly situated class of information handling systems, may be received by the client information handling system hosting an on-box intelligent energy management system to assist in analysis.

The hardware implementation monitoring and reporting system 330 may receive data from a plurality of sensor systems. Sensors can include software and hardware detection mechanisms known in the art to determine performance levels or operation activity of the component devices. It may include additional sensors such as orientation sensors, temperature sensors, data throughput or processing detection systems, and other component device performance detection systems. Orientation sensors, for example, may include one or more digital gyroscopes, accelerometers, and magnetometers in example aspects. As another example aspect, temperature sensors may include thermistors or other temperature sensing systems. Sensor system data may be accumulated at an accumulator sensor hub.

Figure 4:
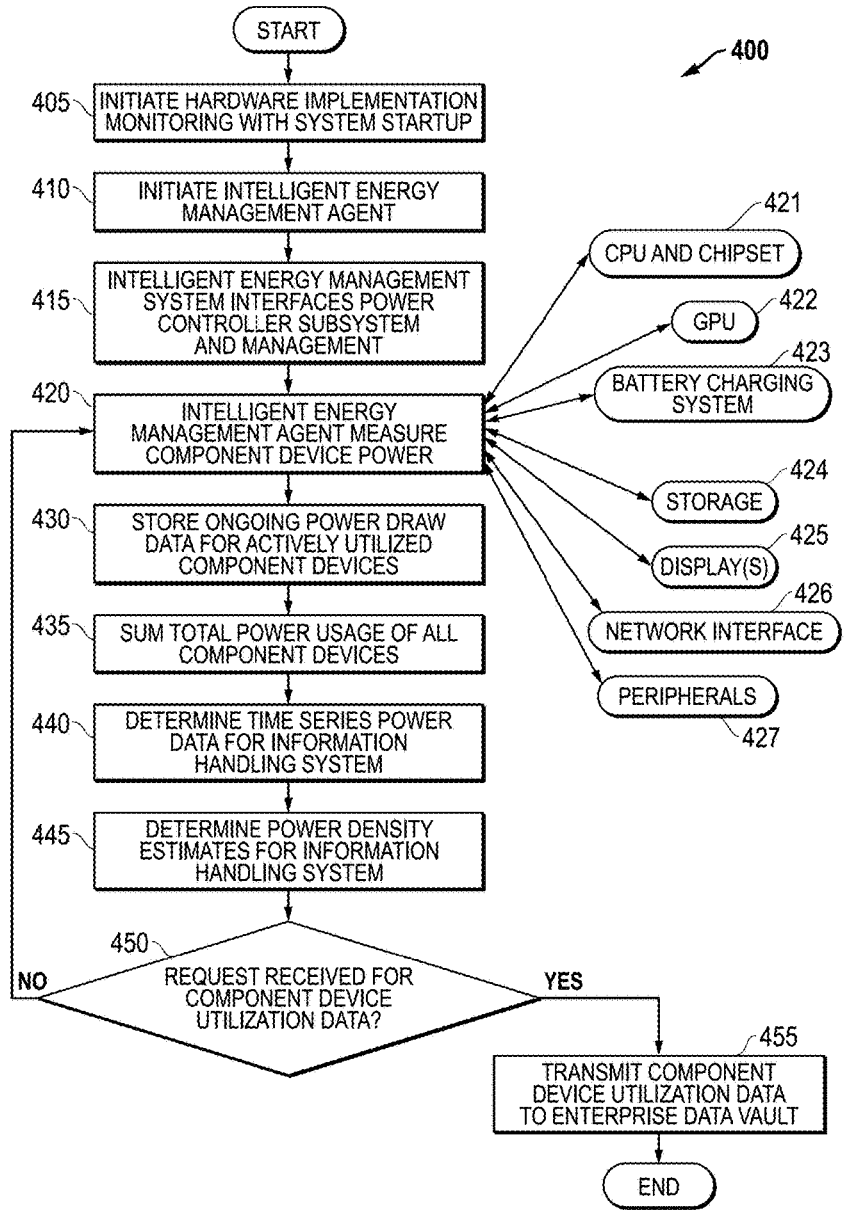
FIG. 4 is a flow diagram illustrating a method of client information handling system hardware utilization assessment according to an embodiment of the present disclosure.

FIG. 4 shows a method 400 for profiling energy consumption and conducting component device usage measurement to accumulate component device utilization data. One or more client information handling systems may operate an intelligent energy management system agent to collect power draw data and other data. The component device utilization data may be reported via a hardware implementation monitoring and reporting system on the client information handling system. As described, this data may be reported back to an intelligent energy management system collecting component device utilization data for client systems across an enterprise or other group of client information handling systems.

In the present embodiment, the flow begins at 405 where a hardware implementation monitoring and reporting system on the client information handling system is initiated. In certain aspects, this hardware implementation monitoring and reporting system may run in the background upon start up of a client information handling system. The hardware implementation monitoring and reporting system tracks the physical state of an information handling system by extending monitoring of system capabilities for system health reporting and other functions. The following Table 1 shows aspects of the physical state of an information handling system that may be monitored for data by the monitoring and reporting system. The data types in Table 1 are example data that may comprise component device utilization data according to aspects of the disclosure and may include identifying data for client information handling systems.

TABLE 1

| Component device or system | System status monitoring |
|---|---|
| Power | Overall current, voltage, power, power on hours (AC versus battery), system power cycles, AC adaptor wattage, power management, hibernate/sleep state requests, time in hibernate or sleep states, temperature |
| Battery | Current, voltage, or power specific to the battery charging systems, relative state of charge (RSOC), current, voltage, power, battery |

TABLE 1-continued

| Component device or system | System status monitoring |
|---|---|
| | cycles, temperature, full charge capacity |
| CPU | Current, voltage, or power specific to the CPU or chipset, CPU usage, throughput, throttle, ACPI power states, processor states, thread number, processor queue length, temperature, etc. |
| GPU | Current, voltage, or power specific to the GPU or graphics system, GPU usage, throughput, throttle, power states, thread number, GPU queue length, temperature, etc. |
| Display | Current, voltage, or power specific to the displays, brightness values, number of displays, raster and refresh rates, etc. |
| Networking | Current, voltage, or power specific to the network interface system, transmission systems, wired versus wireless activity, TX/RX cycles, throughput, TX/RX type (burst, streaming), % of time TX/RX/idle, etc. |
| Hard drive/flash drive | Current, voltage, or power specific to the storage device, bytes for read/write, % of time read/write/idle, temperature, reallocation of sectors, start/stop, free space. |
| Mechanical | Hinge cycles, battery swaps, docking cycles, AC connections. |
| System events | Logs for shutdown, low battery, forced shutdowns, over temperature events, thermal monitoring, display codes, blue screen events, system free fall events detected via motion detection, etc. |
| System configuration | Service tag, system type, BIOS versions, HDD size and model, batter size and serial number, OS, RAM size, PPID or S/N for motherboard, graphics and other component devices or systems. |

An example hardware implementation monitoring and reporting system for an information handling system, including a monitoring system data repository, is the Dell® Data Vault system. In the present embodiment, the intelligent energy management system may coordinate with the hardware implementation monitoring system or is an extension of the same. In other aspects, the intelligent energy management system of the disclosure may work independently of the hardware implementation monitoring systems to coordinate collection of power draw data or other component device utilization data.

Proceeding to block 410, an intelligent energy management system agent on the client information handling system is initiated. As with the hardware implementation monitoring system, the intelligent energy management system agent may be initiated upon startup of the client information handling systems or at another time. Working in connection with the monitoring and reporting system in the present embodiment, power measurement of component devices or systems is conducted and logged in a monitoring system data repository along with additional component device utilization data. At block 415, the intelligent management system agent interfaces via API or other method with the power controller subsystem in charge of managing power usage, battery management and charging, and control of AC power usage. A BMU or PMU or similar power or battery control framework may be accessed.

At block 420, the intelligent energy management system agent may record power usage of several information handling system component devices or systems. For example, the CPU or chipset power draw measurement 421, GPU power draw measurement 422, battery charging system power draw 423, storage system power draw 424, display power draw 425, network interface systems (wireless or wired) power draw 426, and power draw for one or more peripheral devices 427 may be monitored via smart meter hardware measuring current, voltage, or power. The power draw measurement hardware monitors power rails to the component devices or systems for one or more component devices. In other embodiments, sample power measurements may be made in relation to logs of activity of a variety of components and systems to discern and estimate power consumption by individual systems drawing from a common power supply rail. For example in certain embodiments, devices such as a plurality of peripheral devices drawing power via USB or other connections, estimation of power draw may be used. Overall peripheral power draw may be measured and cross referenced with activity of peripheral devices to estimate power draw of individual peripheral devices. Power cycles of the peripheral devices may also be monitored to estimate power transmission to those devices.

Proceeding to block 430, ongoing power draw data is logged in an on-box hardware implementation monitoring system data repository such as the Dell® Data Vault in the client information handling system. Detected power data for component devices and systems of the client information handling system may be logged and stored in the background during operation. The power draw data may be used by the intelligent energy management system agent along with other physical state of system data. Such power draw measurements may reflect component device utilization along with measurements such as detection of data throughput or other activity of the component devices or systems as described above in Table 1 and elsewhere. The power draw data may be reported as part of component device utilization data back to a data repository at a centralized intelligent energy management system in some embodiments of the disclosure.

At block 435, the intelligent energy management system agent may sum some or all of the power measurements for the component devices to provide data points for overall power draw by the client information handling systems in certain aspects. In other aspects, the intelligent energy management system may sum power draws for component device subsets which may be useful to the intelligent energy management system for power demand estimations. For example, a grouping of graphics system components may be useful for determining power draw data for graphics processing system. In an example, graphics system component measurements may group display power draw data, display controllers and drivers, and graphics processing systems. At block 440, in an embodiment, power consumption may be logged for a client information handling system the intelligent energy management system determines time series data for power draws. Time series data may be determined for the overall client information handling system, a subset of system component devices, or individual component devices of the client information handling system.

Proceeding to block 445, in an embodiment the intelligent energy management system agent may operate to conduct a power density estimate of power usage by the client information handling system. In an embodiment, the power density estimate may use component device utilization data stored on-box in a hardware implementation monitoring system data repository at the client information handling system. Examples of time-series data for power usage and power density estimates for an information handling system is shown in more detail below in FIG. 7. The logged component device utilization data, including power usage data may be available for reporting to a centralized intelligent energy management system that is hosted remotely at a host server or remote data center at any time including after power density estimates are determined locally. In other embodiments, the power density determinations and time-series power draw determination may be conducted by a centralized intelligent energy management system hosted at an enterprise server or other host location.

At decision block 450, it is determined whether the monitoring system data repository and the hardware implementation monitoring and reporting system have received a request for data from a centralized intelligent energy management system for an enterprise or other grouping of client information handling systems. If not, the flow returns to block 420 where the system continues to measure component device power draws and log data for the same during operation of the client information handling system.

If a request has been received, the hardware implementation monitoring and reporting system of the client information handling system reports component device utilization data including power draw data to the hosted intelligent energy management system for the enterprise or other system group at block 455. Receipt of a request for component device utilization data may require authentication and be subject to other security measures including encryption as is understood by those of skill. In some embodiments, transmission of the component device utilization data to a host intelligent management system may be prompted by an intelligent energy management system agent periodically or based on another trigger such as a substantial update in logged data, a system shutdown or startup, shutdown or startup of any subsystems, or other understood triggers. In such embodiments, a request for component device utilization data from a centralized intelligent energy management system may not be necessary although such requests may still be used in certain aspects. At this point the flow ends.

Figure 5:
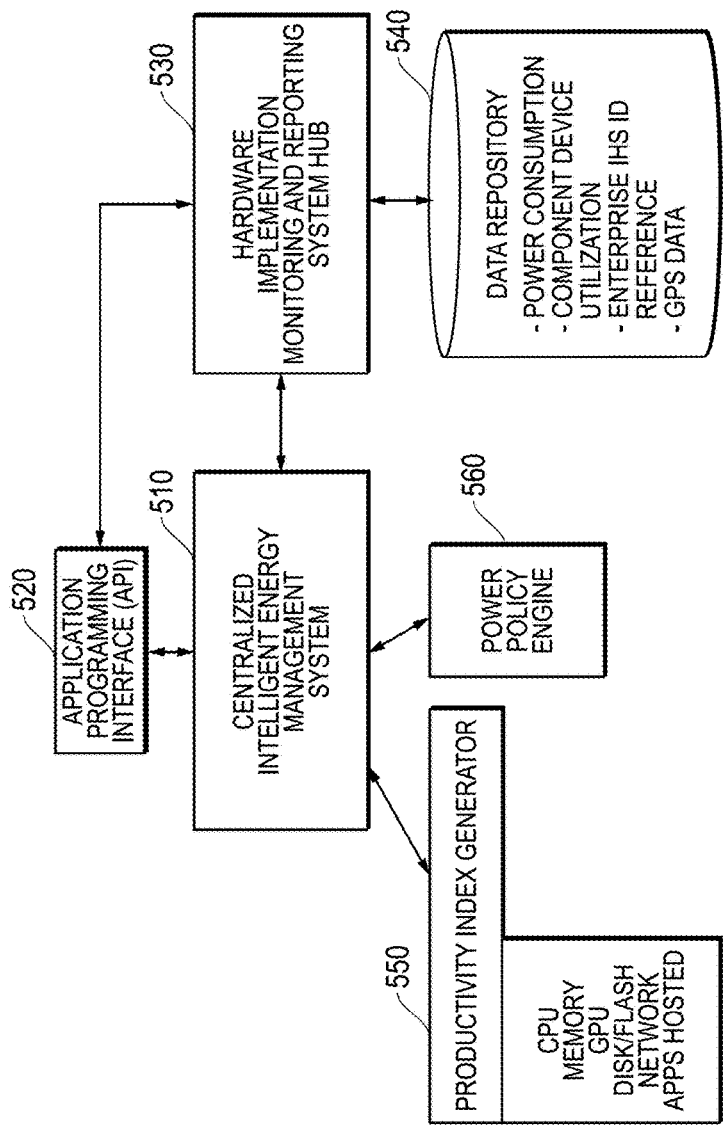
FIG. 5 is a block diagram of components for another aspect of an intelligent energy management system according to an embodiment of the present disclosure.

FIG. 5 illustrates a system block diagram of an aspect of an intelligent energy management system 510 and a hardware implementation monitoring and reporting system hub 530. The intelligent energy management system 510 and a hardware implementation monitoring and reporting system 530 may be hosted on a central server or at one or more remote data centers or some combination. In other embodiments, the intelligent energy management system 510 and a hardware implementation monitoring and reporting system 530 may operate from one or more client information handling systems. The intelligent energy management system 510 and hardware implementation monitoring and reporting system 530 may be deployed by an enterprise IT department to monitor power consumption across the enterprise by client information handling systems supported by the enterprise. It is understood that the disclosure herein is not limited to an enterprise and may be applied to any group of supported information handling systems whereby the intelligent energy management system 510 is used to monitor power consumption and predict energy demand estimates. The intelligent energy management system 510 may also be used to generate or establish power usage policies based on demand estimation and other factors including enterprise critical system or user functions with the client information handling systems. In certain embodiments, the intelligent energy management system 510 and hardware implementation monitoring and reporting system 530 may operate on-box on an individual client information handling system instead of as a centralized system to determine predicted energy demands of that client system and establish power usage policies with respect to energy consumption and battery usage. Such a localized intelligent energy management system 510 may nonetheless coordinate and report to a centralized intelligent energy management system in some embodiments.

Some or all of hardware implementation monitoring system data repository may also be stored at an enterprise server, at one or more remote data centers, or at some combination. The server information handling system executes code to operate the intelligent energy management system 510. As a host to a network of enterprise client information handling systems, the intelligent energy management system 510 and hardware implementation monitoring and reporting system 530 coordinate collection of component device utilization data from a plurality of client information handling systems supported by the enterprise (or other grouping). As described above, the component device utilization data includes power draw data for component devices of the client information handling systems as well as other data examples such as those illustrated in Table 1.

The intelligent energy management system 510 may comprise a set of instructions run on CPU or embedded controller in the chipset(s) of one or more host devices. The intelligent energy management system 510 interfaces with the application programming interface (API) 520 found in the host information handling system software to coordinate various software applications including the hardware implementation monitoring and reporting system hub software code 530 and accesses to monitoring system data repository 540 for component device utilization data. The API 520 may coordinate the intelligent energy management system application 510 and the monitoring and reporting system 530 to conduct power demand estimation across the client information handling systems supported by the group or enterprise.

The monitoring system data repository 540 may store power draw data and other component device utilization data such as identification data for supported client information handling systems. Additional data that may be stored at the monitoring system data repository 540 may include GPS data and timing or calendar data for supported client information handling systems. The intelligent energy management system 510 may access the component device utilization data from a plurality of client information handling systems to determine power demand estimates across the enterprise.

A productivity index generator 550 is a sub-part of the intelligent energy management system 510 in some aspects. The productivity index generator 550 may operate to determine or rank productivity levels of individual client information handling systems supported within the enterprise or group. Productivity assessment by the productivity index generator 550 may assess usage levels of component devices within client information handling systems such as CPU/chipset, memory, GPU, disk/flash storage, network usage, or assessment of applications hosted by the client system when determining a productivity ranking for the client information handling system. Productivity index rankings may be applied to classify plurality of similarly-situated client information handling systems by productivity class within the enterprise as well. Business factors may also affect productivity rankings or classifications. For example, client information handling systems productivity may be affected by tasks regularly performed on them by users. Those tasks may be high priority activity to the enterprise or group. In other examples, the users assigned to certain supported client information handling systems may have a high ranking importance within the enterprise for which power demand estimates may take a priority. These business factors may affect productivity classifications for some client information handling systems. For example, productivity index rankings of client information handling systems may be affected by the user of the client system. In an aspect, the executive levels of users may factor into the productivity index. These enterprise business factors may impact the determination of productivity index calculations for client information handling systems.

In some embodiments, the productivity index assessment may even made at the level of component device productivity within client information handling systems. In these examples, a productivity index may be assessed for particular component devices and systems. As a result, power consumption and demand estimation for those component devices may be assessed and power policy tailored according to component device power demand estimations. Thus, energy consumption demand assessments may be made for client information handling systems that typically perform productivity tasks involving certain component devices or sub-groupings of devices. For example, the tasks performed by users of the client information handling system may emphasize certain component devices over others. Those component devices may receive higher productivity indices as a result which may later factor into power policy determinations. It is understood that higher productivity indices would correspond to higher productivity rating for a client information handling system or a component device. However, it is understood that an index system could be used whereby a lower index value corresponds to a greater rating of productivity as well in other aspects.

Power demand estimates may be established by the intelligent energy management system 510 with access to historic component device utilization data stored in monitoring system data repository 540. In an aspect, the component device utilization data from monitoring system data repository 540 is data collected over a period of time from the client information handling system being assessed to discern trends of usage. In other embodiments, the intelligent energy management system 510 may assess data from a subset of similarly situated client information handling system to discern trends in power consumption and component system utilization. In yet other embodiments, the intelligent energy management system 510 may access component device utilization data including power consumption for all available client information handling systems to compare or contrast utilization and determine estimated power consumption within portions of the enterprise.

Power demand estimates may be conducted differently for the variety of component devices of each client information handling system or of a class of client information handling systems in certain embodiments. The intelligent energy management system may assess this productivity index and power demand estimation based on usage history, including power draw data, stored with component device utilization data in the monitoring and reporting system and monitoring system data repository. In some embodiments, this determination of power demand estimates and productivity indices may impact power usage policies established by power policy engine for the enterprise IT department.

In other embodiments, an intelligent energy management system may also operate on-box on a client information handling system. The intelligent energy management system 510 may coordinate with a power management controller sub-system to collect component device utilization data for the client information handling system for power demand estimation on-box. In such an on-box embodiment, the monitoring system data repository 540 having component device utilization data may be utilized by the on-box intelligent energy management system to prepare power demand estimates specific to the client information handling system. The on-box component device utilization data, including power draw data collection, and power demand estimations for the client information handling system may be networked with a hub host system to share on-box power demand estimations across an enterprise in some example embodiments. In such cases, data from other client information handling systems, such as a similarly situated class of information handling systems, may be received by the host information handling system hosting an intelligent energy management system 510. It is understood that the host information handling system of the intelligent energy management system 510 may be a host server, remote data center, or another client information handling system in various embodiments.

Figure 6:
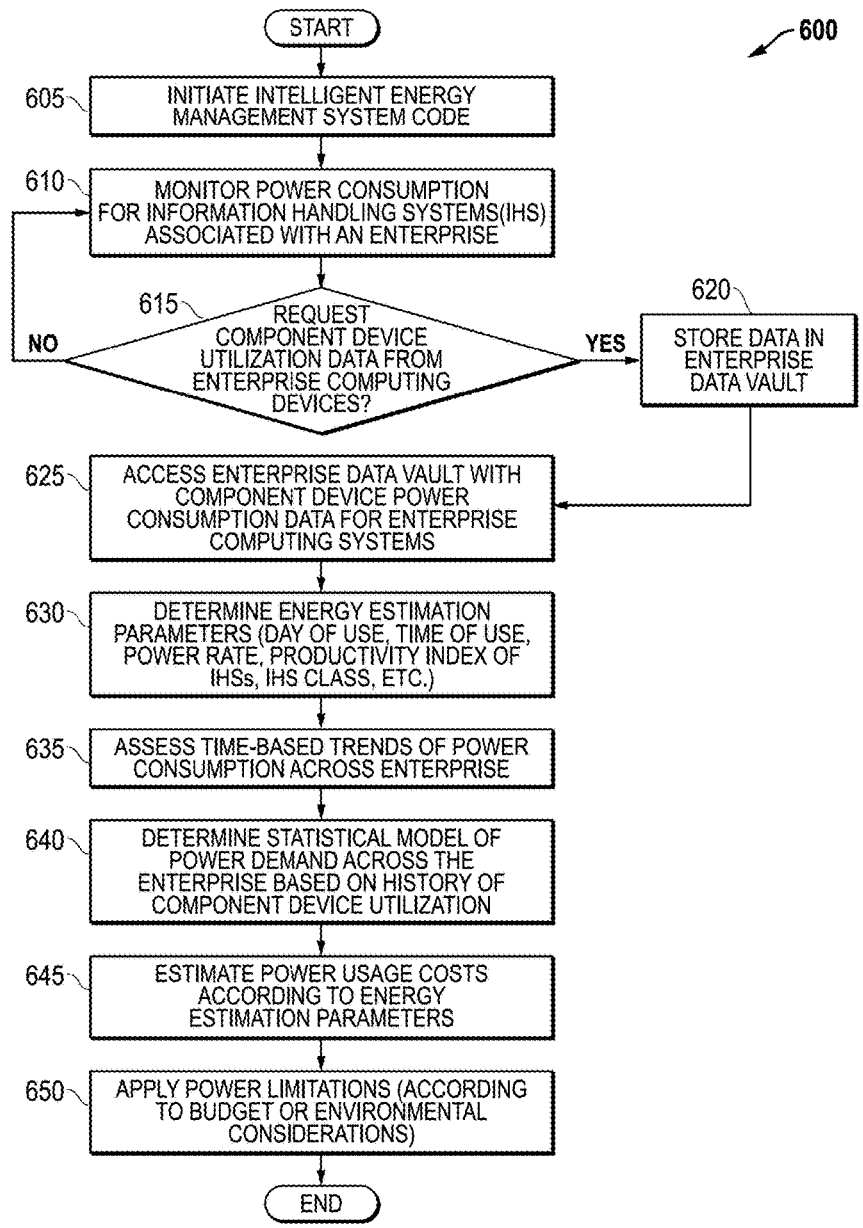
FIG. 6 is a flow diagram illustrating method of information handling system power demand estimation according to an embodiment of the present disclosure.

FIG. 6 shows a method 600 for estimating energy demand for one or more client information handling systems from data received from across a plurality of client information handling systems associated with a group or enterprise. The method begins at block 605, where the host system may initiate the intelligent energy management system code on the host device or remote data server if not already initiated. The host device or remote data servers may serve as a centralized intelligent energy management system in an embodiment of FIG. 6.

At block 610, the intelligent energy management system monitors power consumption for client information handling systems associated with a group or enterprise. As described in FIG. 4, intelligent energy management system agent software located on one or more client information handling systems of the enterprise may take measurement of component device utilization data. This component device utilization data may include power consumption data for component devices or systems in each monitored client information handling system. Some portion of the client information handling systems associated with an enterprise or group may be monitored in some embodiments. In other embodiments, all client information handling systems associated with a group or enterprise may be monitored.

Proceeding to decision block 615, the intelligent energy management system may initiate a request for component device utilization data from one or more monitored client information handling systems. If a request for data has not been issued, flow returns to block 610 where client information handling systems continue to be monitored by the intelligent energy management system agents and the hardware implementation monitoring and reporting systems embedded thereon. If a request is issued and component device utilization data is retrieved from one or more client information handling systems, flow proceeds to block 620. In other embodiments, it is understood that the intelligent energy management system agent and hardware implementation monitoring and reporting system may report component device utilization data to a monitoring system data repository at any time from a monitored client information handling system in various embodiments. For example, the intelligent energy management system agent may report component device utilization data to the intelligent energy management system including by its own initiation, periodic reporting, reporting triggered by an event or threshold such as detection of new data, or any combination. Thus, in some embodiments, issuance of a request for component device utilization data may not be necessary. The flow may proceed to block 620 upon receipt of component device utilization data. Security measures including encryption and security verification may be deployed in the course of communications of reported component device utilization data.

At block 620, data from monitored client information handling systems is stored in a monitoring system data repository as described above. Proceeding to block 625, the intelligent energy management system code will access current component device utilization data stored in the monitoring system data repository. Accessed data may include component device power consumption data as well as other component device utilization data as described in Table 1 and elsewhere.

The intelligent energy management system will determine what energy estimation parameters will be used in power demand estimation at block 630. The energy estimation parameters may determine the bounds or view of power demand estimation desired by the IT manager or other users of the intelligent energy management system. The component device utilization data collected by the intelligent energy management system is complete enough to provide a high degree of confidence in power demand estimations. Furthermore, the completeness of the data gathered by the intelligent energy management system permits a wide set of optional parameters to be applied to view specific aspects power demand estimation. Previous power demand estimation for client information handling systems involved rudimentary assumptions and power consumption measurement at very high levels.

Energy estimation parameters may include application of determined productivity indices of client information handling systems associated with the enterprise or group. The productivity indices of the client information handling systems may be determined in accordance with disclosures herein and may include analysis of component device utilization data to track trends in activity of component devices or systems. Determination of productivity indices may also be subject to energy estimation parameter settings set by an enterprise or group IT administrator or other user. Productivity indices may be used to classify groups of client information handling systems and those classifications may serve as energy estimation parameters in example embodiments. Other energy estimation parameters determined at block 630 will include periods of time or use, days of usage, physical locations, selection of particular component devices for analysis, and power rates to estimate power consumption costs, among other parameters as may be understood can be applied to power demand estimation of the present disclosure.

At block 635, intelligent energy management system will utilize time specific data from the component device utilization data for individual client information handling systems to determine time-based trends of power consumption across the enterprise. This data may be specific to days of the week or to overall daily power consumption trends. Also, the time-based trends may be applied to all measured client information handling systems or may be broken down by class of client information handling system within the group or enterprise in some embodiments. In other embodiments, the time-based trends may also reflect power consumption trends for specific device components or categories of device components within the enterprise client information handling systems. Time-based trends may also include time-series power demand estimation data useful to generate statistical models or to calculate future power demand within parts or all of an enterprise.

Proceeding to block 640, the intelligent energy management system will determine a statistical model for future power consumption across the group or enterprise based on the historical trends of power consumption. The statistical model may also be time-based and specifically reflect expected daily trends or trends expected for given days of the week. Seasonal trends may also play a factor. In some embodiments, the statistical model of power demand across the enterprise may be broken down by productivity index class of client information handling system within the group or enterprise in some embodiments. In some embodiments, statistical models of power demand data may be made for specific component devices or categories of device components within the enterprise client information handling systems to allow IT professionals to review trends in power consumption and device utilization specific to aspects of operation of the client information handling systems at a device component or system level. The estimates of demand may take into account various factors to adjust the energy demand estimation. For example, battery usage by client information handling systems will shift power consumption levels to a time of when battery charging is conducted with A/C power. In another example adjustment, client information handling system GPS data may be used to discern that a user may be travelling, or working from home. GPS data for client information handling systems will also allow power demand estimation to be determined according to locations such as enterprise-owned buildings or campuses. In those cases, the client information handling system may not necessarily be counted as consuming enterprise A/C power for the enterprise energy budgeting. Such trends of travel/work from home may be modeled as well for a portion of the client information handling systems to adjust the modeled estimates of enterprise power demand.

Time-based statistical models that track statistical confidences for time-based trend data may also permit IT managers to identify spikes in estimated energy demand based on historical power consumption data in component device utilization data. Identification of future spikes in energy demand, such as peak need timeframes, allows an enterprise to prepare for or predict those timeframes and set in motion policies to mitigate energy usage during those peak need timeframes. With the intelligent energy management system, energy demand estimate calculations carry an improved degree of statistical confidence and may be tailored to specific client information handling systems or their component devices.

Because the device component utilization data is available at a very specific level from the monitored client information handling systems, a substantially accurate and dynamic statistical power calculation may be made to estimate energy demand. Furthermore, because of the granularity of the device component utilization data available to the intelligent management system, statistical models of several facets of estimated power consumption demand may be determined. Likewise, time-based statistical modeling of energy demand also permits IT managers to identify spikes in estimated energy demand such as peak need timeframes with respect to specific component devices or sub-groups of component devices deployed in the enterprise within client information handling systems. For example, peak need for power consumption may be determined for battery charging components, network interface components, display components, CPUs, GPUs, and the like. This identification of peak needs with respect to component devices may be a powerful analysis tool for enterprise IT managers.

The statistical model of power demand estimation may be determined based on several limitations placed on the data as described above. In various embodiments, a statistical model of data for power consumption may be made with respect to particularized times, seasons, locations, class or sub-grouping of information handling system, component devices, or other parsing of the gathered device component utilization data. Similarly, as shown in certain embodiments herein, a statistical model for overall power consumption across the enterprise or other group may be conducted as well by the intelligent energy management system. Depending on the analysis required, it is understood that the intelligent energy management system may conduct either parametric or non-parametric statistical analysis of the data to yield a demand estimation model with substantial accuracy and confidence levels for use by IT professionals for the enterprise or group. The parametric or non-parametric statistical model of power consumption may be made by the intelligent energy manager to determine probability distributions for power demand levels depending on availability and accuracy of statistical parameter assumptions in accordance with several understood statistical analysis techniques.

Various statistical models may be used and applied to the variety of aspects of the component device utilization data described herein. For example, in an embodiment, a non-parametric kernel density estimate model may generate a probability density function to estimate power usage over a given period of time among a population of client information handling systems. In another embodiment, the kernel density estimate may be applied to data for specific to types of component devices or systems in the population of client information handling systems monitored for component device utilization data and including power consumption. Other statistical modeling may be used as is understood. For example, a parametric statistical model may be used in which an assumed power consumption distribution function may be selected and the component device utilization data curve fit to the presumed base model in certain embodiments. Parametric models, such as normalized or lognormal parametric models, may yield additional accuracy assuming a properly selected base set of assumptions of the power consumption usage distribution over a population of client information handling systems or other aspects of component device utilization data as is understood. By statistical analysis of power consumption data for a plurality of client information handling systems throughout an enterprise, energy use of the enterprise may be estimated with a reasonable certainty. Moreover, the component device specificity of the component device utilization data allows for statistical energy demand estimation at a granular level for classes of component devices across some or all of the enterprise. Further, the intelligent energy management system provides for flexibility in determining and accounting for productivity and usage of individual enterprise client information handling systems alone and in relation to the entire enterprise.

At block 645, the intelligent energy management system will apply energy rates to the modeled estimates of power demand for the enterprise client information handling systems to yield estimated power consumption costs for the enterprise. The power consumption costs may be a time-series estimate as above with energy demand estimation. In some embodiments, the power consumption cost estimate may be modeled by day of the week, seasonally, or otherwise. The estimated power consumption costs also may be broken down as before by classification of client information handling systems, by locations within the enterprise or group, or by component devices or subsets of component devices in various embodiments. The energy rates may be shifting rates depending on time of day usage for the enterprise or may shift depending on time of year. The power consumption costs may be a location-based estimate or some combination of time or location basis. Energy rates may shift depending on location of the consuming client information handling system. Furthermore, adjustments to energy demand estimation similar to the above described adjustments may also factor into adjustment to the modeled estimates of power consumption costs such as travel or off-site operation. Other factors may also impact the cost of energy to an enterprise or group utilizing the intelligent energy management system of the present disclosure.

At block 650, the intelligent energy management system may have power consumption limitations or target caps by which IT personnel aim to control consumption or costs. The power consumption limitations may be made according to budget or environmental considerations. The intelligent energy management system may indicate via the modeled time-based power demand estimation time periods where estimated power demand may reach one or more thresholds set during periods of time. These indicators may be used by IT personnel to provide for additional budgeting for power consumption or to implement measures to reduce expected demand. It is understood that the steps performed above need not be performed in any particular order. Additionally, some steps may not be performed or other steps may be added to the embodiment described above. Embodiments are contemplated to include any portions of the above embodiment in any order and in combination with other embodiments as is understood.

Figure 7:
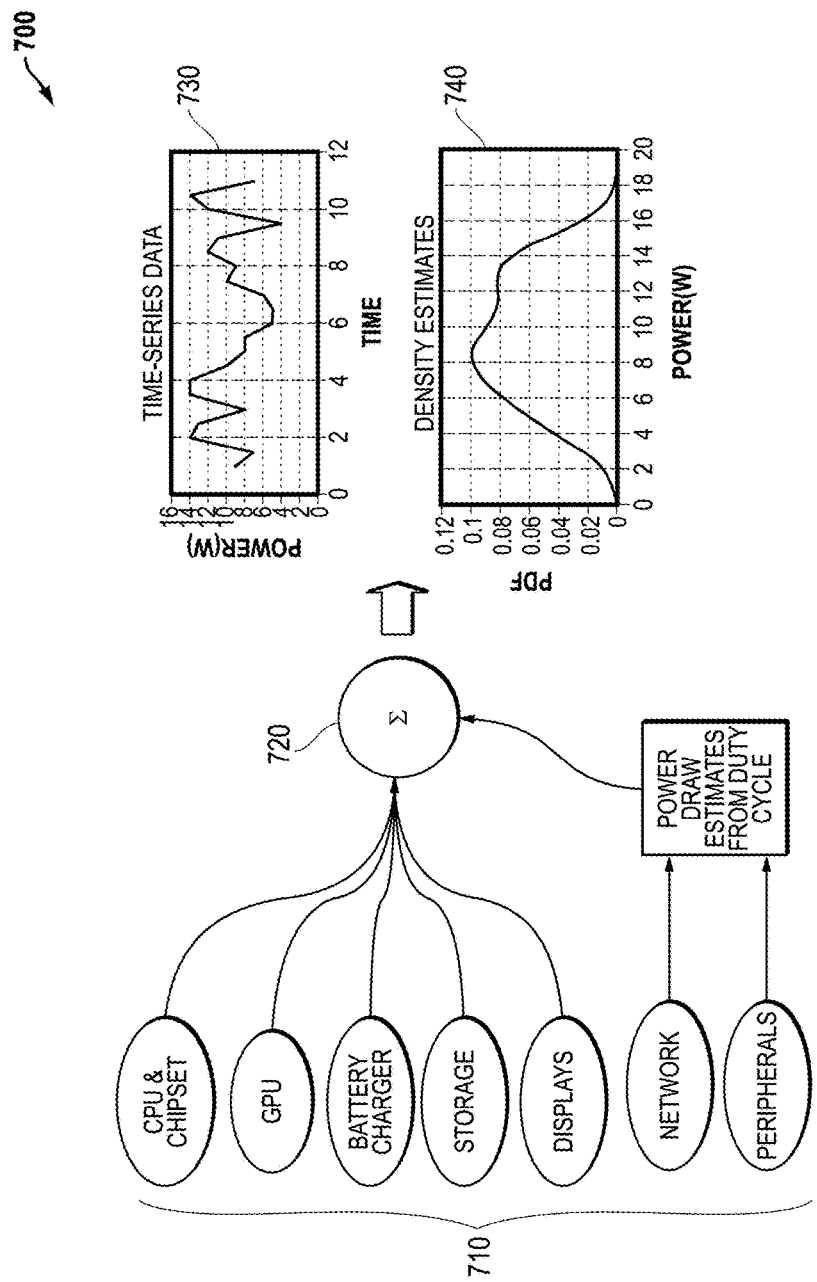
FIG. 7 is a graphical chart illustrating an example power draw determination of one or more client information handling systems according to an embodiment of the present disclosure.

FIG. 7 illustrates by graphic depiction the process of component device utilization data collection including power consumption and development of power demand estimation via the intelligent energy management system of the present disclosure. The assortment of component devices or systems monitored for power consumption is shown at 710. The present embodiment may include direct power measurements made from power supply rails to component devices including the CPU, chipset, GPU, battery charger, storage/drive devices, displays, and other component devices as described above. Each monitored client information handling system, as described, may have intelligent power management system agents conduct the power consumption data collection. The monitoring and reporting system operating on the monitored client information handling system may report power consumption data and other component device utilization data back to the centralized intelligent energy management system and the monitoring system data repository. Other components, such as peripherals or network connected devices operating via the client information handling system may not have power measurement of their power supply rails available. As shown in FIG. 7, in a case where measurement of power supply rails for a component device or system is not available, power draw estimates may be made based on duty cycle of power consumption, component device operation, or monitoring of total system power consumption.

At 720, intelligent energy management system assess overall power consumption data for the various component devices of the client information handling systems in a group or enterprise. The power consumption data along with additional component device utilization data as illustrated above in Table 1 is used to determine time-series data illustrating power demand and enterprise power demand estimations according to statistical models applied. In an example embodiment for a monitored client information handling system, component device power consumption measurements may be summed to provide a total power consumption level. Data from a plurality of client information handling systems may be then summed or extrapolated across an enterprise.

Graph 730 is an example of potential time-series data for power consumption by the monitored client information handling systems of the group or enterprise. Historical power consumption is shown over a 12 hour period. This data is merely exemplary for purposes of illustration. The time-series power consumption data of 730 may also be specific to certain classes of client information handling system, may be specific to component device types, or to other energy demand factors for analysis of power consumption within the enterprise. In an example, data such as 730 may show a statistical model of time series energy demand with confidence bands around the data points in the time-series power data. This may help to establish predictive reliability of future energy consumption demand estimates over similar time periods within the enterprise based on sample sizes and other factors.

Graph 740 illustrates power density estimates indicating expected demand. In this example embodiment, a probability density function (PDF) is shown for power consumption levels (W) for a client information handling system over a defined period of component device utilization data collection. In other aspects, graph 740 may also represent a probability density function (PDF) for power consumption levels (W) for a population of client information handling systems or component device types within an enterprise or group. The statistical model used in the illustrated example embodiment is a non-parametric kernel density estimation of power consumption across the monitored population selected for modeling. Other statistical modeling techniques are also contemplated. As above, the shown graph is merely exemplary for the purpose of illustration.

Figure 8:
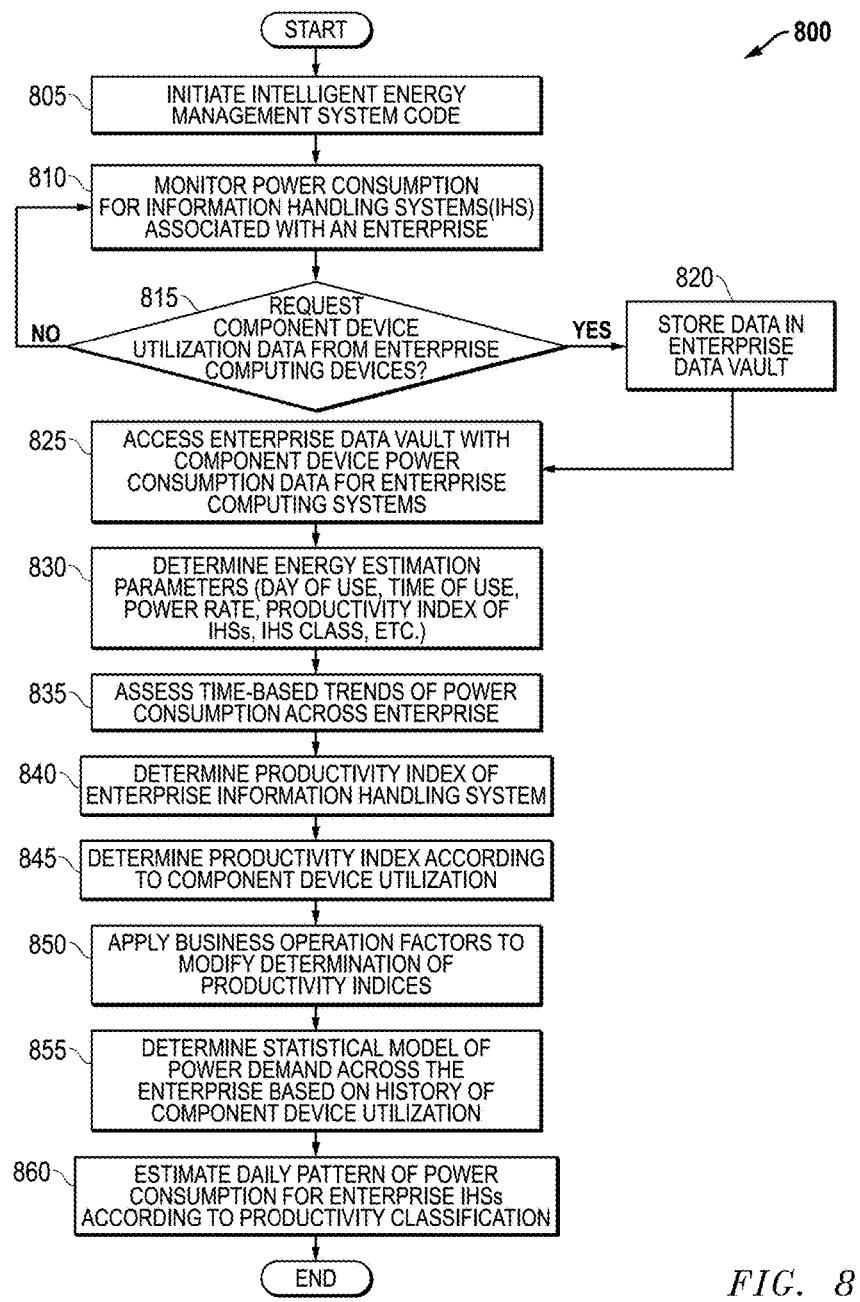
FIG. 8 is a flow diagram illustrating another method of information handling system power demand estimation according to an embodiment of the present disclosure.

FIG. 8 shows a method 800 for estimating energy demand for client information handling systems from component utilization data received from across a plurality of client information handling systems associated with a group or enterprise. The method begins at block 805, where the host system may initiate the intelligent energy management system code on the host device or remote data server if not already initiated.

At block 810, the intelligent energy management system monitors power consumption for client information handling systems associated with a group or enterprise. As described above, intelligent energy management system agent software located on one or more client information handling systems of the enterprise may take measurement of component device utilization data. This component device utilization data may include power consumption data for individual component devices or systems.

Proceeding to decision block 815, the intelligent energy management system may initiate a request for component device utilization data from one or more monitored client information handling systems. If a request for data has not been issued, flow returns to block 810 where client information handling systems continue to be monitored by the intelligent energy management system agents and the hardware implementation monitoring and reporting systems embedded thereon. If a request is issued and component device utilization data is retrieved from one or more client information handling systems, flow proceeds to block 820. As stated previously, it is understood that the intelligent energy management system agent and hardware implementation monitoring and reporting system may report component device utilization data to a monitoring system data repository at any time from a monitored client information handling system without a data request in other various embodiments. For example, the intelligent energy management system agent may report component device utilization data including by its own initiation, periodic reporting, reporting triggered by an event or threshold. For example, detection of new data, or new data that has not been transmitted for a period of time may trigger reporting.

At block 820, the collected component device utilization data reported from monitored client information handling systems is stored in a monitoring system data repository such as Dell® Data Vault as described above. Proceeding to block 825, the intelligent energy management system code will access current component device utilization data stored in the monitoring system data repository. In one aspect, the intelligent energy management system will retrieve component device power consumption data for the plurality of monitored client information handling systems.

The intelligent energy management system will select various energy estimation parameters for calculation of the energy consumption determination and statistical modeling of estimated energy demand calculations at block 830. Example energy estimation parameters may include demand estimation modeling parameters for specified time blocks, for given days of the week, for given seasons, for certain enterprise locations, for various power rate levels, for determined classifications of client information handling systems, for given component device types, or the like. It is understood that any range or aspects of the energy estimation parameters may be selected with which to statistically model energy demand by the intelligent energy management system. In an aspect, a plurality of energy estimation parameters may be deployed to provide the energy demand estimation analysis desired by the IT management or other users of the intelligent energy management system of the present disclosure. For example, time block parameters may include any range of minutes, hours, days, weeks, months, or more. Enterprise locations or device component types may be defined with any level of granularity as well. For example, GPS data for client information handling systems will allow power demand estimation to be determined according to particular locations such as enterprise-owned buildings or campuses. Settings for the energy estimation parameters may be made via a graphic user interface with the intelligent energy management system or via other data entry method as is understood in the art. Productivity classification or application of business factors may also comprise energy estimation parameters to bound or define the energy demand statistical models created in some embodiments as well. The specificity of the component device utilization data provides for flexibility to develop statistical models of anticipated energy demand reflecting almost any facet of power consumption from throughout the enterprise by client information handling systems or their component devices as desired.

Accordingly, the statistical modeling from the monitored component device utilization data may be set to yield various views of energy demand estimation for IT managers to predict or plan enterprise energy consumption or budgets. In other embodiments, the statistical modeling may provide a reasonable certainty with respect to enterprise energy usage and power consumption for the purposes of triggering, automatically or otherwise, energy policy issued by the enterprise with respect to one or more client information handling systems.

Proceeding to block 835, the intelligent energy management system will draw data from the collected component device utilization data relevant to time periods selected as a power demand estimation calculation parameter. In other words, if a time period has been selected for analysis, the intelligent energy management system will draw data falling within the selected timeframe. In another example, a selection of all time for analysis will draw all reported data for use in the statistical modeling. In an aspect, the time based data may include time series data such as power consumption levels over time during various periods.

The flow proceeds to block 840 where the intelligent energy management system may determine a productivity index for one or more client information handling systems. In certain aspects, the intelligent energy management system may determine productivity indices of client information handling systems associated with the enterprise or sub-groups within the enterprise. The productivity index for client information handling systems may be determined in accordance with disclosures herein and amount to a ranking of client information handling systems operating within or on behalf of the group or enterprise. The productivity index assessment for the client information handling systems may include productivity index analysis of device component utilization data for component devices and subsystems for assessment of productivity levels of those component devices.

At 845, the intelligent energy management system will determine productivity indices for client information handling systems within the group or enterprise for particular component devices or systems. The productivity index for component devices of a client information handling system may indicate to IT professionals monitoring energy consumption the utilization needs or requirements for client information handling systems. Productivity indices may be used in energy usage budgeting via the intelligent energy management system. Further, the component device productivity indices for specific component devices or systems will also help IT professionals to shape energy usage policies within the enterprise specific to client information handling systems or classes of client information handling systems.

Proceeding to block 850, business operational factors may also be used to modify or influence productivity indices applied to individual or classes of client information handling systems. In some embodiments, the business operational factors may influence productivity indices determined for particular component devices or systems within the client information handling systems. Business operational factors may be set by an IT administrator or other users to have influence on the productivity index as desired. The business operational factors may classify client information handling systems based on importance of operations being performed on those systems to the group or enterprise. In other embodiments, particular component device productivity indices may be shaped by the specific operations performed on those systems and the importance of those particular operations to productivity within the enterprise or group. For example, a client information handling system used to debug code or perform algorithmic calculations may require high priority for power allotment to meet demand from CPU and chipset operation, however, graphics, display, and network interfacing may be lower priority tasks and component devices for that client information handling system. Accordingly, productivity indexing may be weighted higher for CPU and chipset operations in such an example. Information handling system component device utilization data may be used to discern usage trends, patterns, and configuration. These component device usage trends may indicate to the intelligent energy management system typical uses for an enterprise client information handling system and contribute to productivity indexing and application of business operational factors.

In one example embodiment, boundaries may be set for client information handling systems with respect to productivity index determinations based on business operation factors. Productivity index boundaries that may be designated at various levels of operational importance for a client information handling system or for particular component devices. For example, some client information handling systems may operate mission critical software or functions for a group or enterprise that may be prioritized ahead of virtually all other operationally active systems performing lower priority tasks. Mission critical client information handling systems may have a productivity index floor set for them yielding a generally high ranking. Similarly a productivity index floor may be set for particular component devices on some client information handling systems depending on the mission critical tasks performed that involve those component devices. In other embodiments, lower priority client information handling systems may have a ceiling placed on the productivity index class within which they may be classified. Other similar boundaries or weighting of component devices are contemplated as well when determining productivity indices and relevant client information handling system productivity classifications. Productivity indices may be used to classify sub-groups of client information handling systems for analysis of estimated power demand across those sub-groups as well. The client information handling system productivity classifications may be used for purposes of energy management budgeting and power policy decisions by IT management.

Proceeding to block 855, the intelligent energy management system will determine a statistical model for future power consumption across the group or enterprise based on the historical trends of power consumption. In other embodiments, the statistical model for future power consumption may be tailored to show power demand estimation for portions of the population of client information handling systems within the enterprise as well. For example, productivity index classifications may yield separate statistical models for future power consumption to enable analysis by productivity classification or other energy estimation parameters as described above. Other energy estimation factors such as location, system type, business factors, or other population breakdowns may be used to generate more specified statistical models for future power consumption by the specified subsets of the population of client information handling systems supported in an enterprise.

In an embodiment, the statistical model of estimated power demand may also be time-based. For example, the statistically modeled energy demand estimate may specifically reflect expected daily trends or trends expected for given days of the week. As described above, in some embodiments a statistical model of power demand may be made for particular device components or categories of device components within the enterprise. Such a breakdown of power demand within client information handling systems to allows IT professionals to review trends in power consumption and device utilization specific to aspects of component device operation of the client information handling systems.

Because of the specific level of the component utilization data from the monitored client information handling systems, improved accuracy for power consumption demand estimates may be statistically modeled by the intelligent energy management system for enterprise client information handling systems. Moreover, the breadth of the data collected by the intelligent energy management systems further yields a dynamic tool to view statistical power demand calculations for IT professionals to estimate energy demand for many facets within the group or enterprise. Energy demand estimations may be output by the intelligent energy management system via a display for review as power density graphs, time-series graphs, output of indications for peak demand times, or other data outputs for review by enterprise IT management departments in some embodiments.

As described above, the intelligent energy management system may use a variety of parametric or non-parametric statistical techniques to generate the statistical models of power consumption estimations. It is understood that the steps performed above need not be performed in any particular order. Additionally, some steps may not be performed or other steps may be added or included to the embodiment described above. For example, the intelligent energy management system may apply energy rates to the modeled estimates of power demand for the enterprise client information handling systems to yield estimated power consumption costs for the enterprise as described with respect to FIG. 6. Further, the intelligent energy management system may have power consumption limitations or target caps by which IT personnel aim to control consumption or costs as also describe with respect to the embodiment of FIG. 6.

Figure 9:
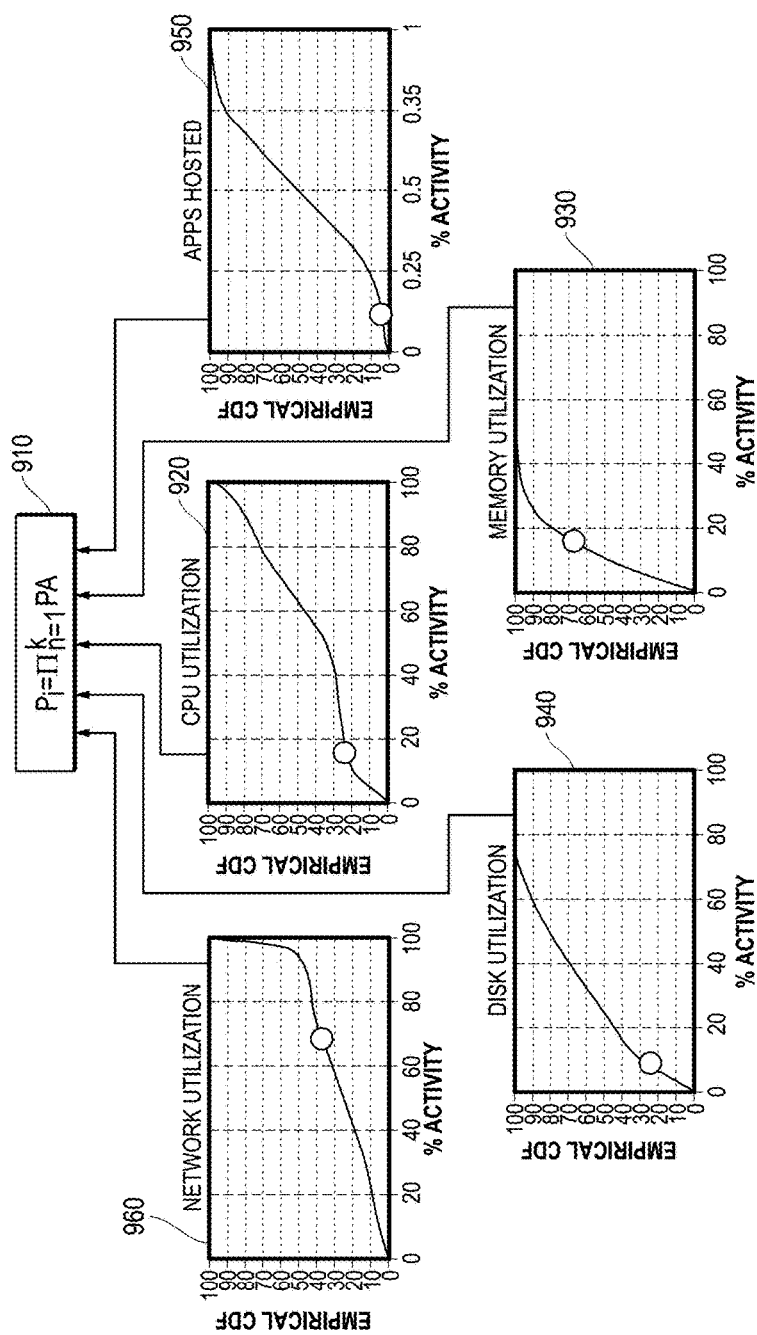
FIG. 9 is a graphical chart illustrating example productivity estimation for client information handling systems according to an embodiment of the present disclosure.

FIG. 9 illustrates the process of productivity index generation for client information handling systems within a group or enterprise. A productivity index for client information handling systems operating on behalf of the group or enterprise is assessed based on stack ranking of the productivity metrics relative to the plurality of client information handling systems within the group or enterprise. At 910, an example embodiment shows a determination of a productivity index ($P_i$) as follows:

$$\text{Productivity Index } P_i = \Pi_{n-1 \text{ to } k}(PA),$$

where k=normalized ranks of performance attributes (PA) such as CPU use, GPU use, display use, memory use, disk use, apps hosted, etc.

Each client information handling system may be ranked by this productivity index score based on productivity metrics for all client systems or for all monitored client systems. Alternative productivity index determinations are also contemplated including utilization of differing factors or weighting. For example normalized performance attributes (PA) may have a weighting factor depending on application of business operational factors. Note that the weighting factors are not shown in the illustration at 910.

In other aspects, ranking by productivity index score may be limited to one or a subset of component devices such that component devices or systems within the client information handling system may receive productivity index scores with respect to similar devices in other enterprise client information handling systems. In such an example, a productivity index may apply weighting but utilize performance attributes (PA) for each component device or system of component devices and then compare the resultant productivity indices to rank component devices among enterprise client information handling systems. In yet another aspect, specific component devices and systems may have productivity indexes generated similar to described herein with respect to other component devices or system within the same enterprise client information handling system. Thus, productivity of specific component devices or subsystems for individual client information handling systems may be indexed and used to select power policy implementation without adversely affecting productivity of each entire client information handling system. Power policy implementation may apply to component devices with lesser productivity index ratings such as those that are less typically utilized and necessary to a user's productivity for tasks on the client information handling system.

Several performance attributes (PAs) are shown by way of example illustration relating to gathered component device utilization data in FIG. 9. These performance attributes are shown in FIG. 9 as empirical cumulative density functions of operational activity for specific component devices in the client information handling systems. The activity percentage for each performance attribute may be drawn from component device utilization data such as that shown above in Table 1 and relating to workload measurements by those component devices. It may or may not include power consumption measurements in certain embodiments since power consumption may not relate directly to workload and productivity. In other embodiments, it may rely heavily or entirely on power consumption measurements of component devices at least in some part.

At 920 a cumulative density function of CPU utilization is shown relative to CPU percentage of activity. As described above in Table 1, CPU usage, throughput, throttle, ACPI power states, processor states, thread number, processor queue length, temperature, as well as power or current usage may be monitored for the CPU and chipset by the hardware implementation monitoring and reporting systems. This may include power monitoring in connection with the intelligent energy management system.

At 930, the cumulative density function of memory utilization is shown relative to memory activity. Disk utilization is shown at 940, and network utilization is shown at 960. Additional example embodiments may include other monitored component devices or systems as described elsewhere in the present disclosure. At 950, the intelligent energy management system may determine a cumulative density function of client information handling systems with respect to number of applications hosted. The application host count may be limited to particular applications hosted by the population of client information handling systems in some embodiments. At 960, the intelligent energy management system may determine a cumulative density function of client information handling systems with respect to network utilization activity. Each of 920, 930, 940, 950, and 960 are examples of component devices or aspects of client information handling systems that may have utilization monitored and which may factor into the productivity index.

To generate the productivity index for each client information handling system. The stack ranking for that machine, shown as the circle data points in utilization graphs 920, 930, 940, and 950 are assessed as a product of these rankings to provide a productivity index score. This may provide an overall ranking for the client information handling system. In the shown graphs, the example client information handling system shows high network utilization, but lower values for the other performance attributes. It is noted that the shown graphs are merely exemplary graphical data for the purpose of illustration of the present disclosure.

As described earlier, the productivity index determination may also implicate business factors that serve as weighting factors in some embodiments. For example, weighting factors may be applied to business critical client information handling systems performing business critical projects. Application of these business factors for business critical projects to weight productivity index determination will increase the ranking for those client information handling systems operating the business critical projects. Moreover, business factors may be applied to component devices whereby certain performance attributes are weighted to be emphasized with respect to determination of overall productivity index determinations. For example, the intelligent energy management system may weight network utilization performance attributes for systems operating in all or a portion of an enterprise focused on internet transactions or other network-based transactions. Thus productivity index determination may be weighted depending on the business factors or the enterprise or group utilizing the intelligent energy management system of the present disclosure.

Business factors may impact productivity index determinations as productivity index boundaries applied to client information handling systems or to component devices during productivity index determinations and rankings. The productivity index boundaries may be designated at various levels of operational importance of the client information handling system or of particular component devices. For example, some client information handling systems may operate mission critical software or functions for a group or enterprise that may be prioritized ahead of other operationally active systems performing lower priority tasks in some embodiments. Mission critical client information handling systems may have a productivity index floor set for them. A productivity index floor may be set for particular component devices on these client information handling systems depending on the mission critical tasks performed in some embodiments, but not on the entire client information handling system. In yet other embodiments, lower priority client information handling systems may have a ceiling placed on the productivity index class within which they may be classified. Other similar boundaries or weighting of component devices may be applied as well when determining productivity indices and relevant client information handling system classifications.

With the productivity index calculation for ranking a client information handling system relative to its peers in the enterprise or a sub-group of client information handling systems in the enterprise, a weighting factor applied as a business factor may increase a productivity ranking for the client information handling system or one or more of its component devices. A floor or ceiling boundary for productivity ranking may also be applied to the client information handling systems or a component device in productivity rankings within the enterprise.

Productivity indices may be used to classify sub-groups of client information handling systems for determination of estimated power demand across those classes. These productivity class determinations may be used to establish power cost budgets based on productivity index class. Productivity indices may also be broken down according to productivity index rankings for purposes of implementing power policies. Application of power policies to limit use of client information handling systems or of component devices within those client information handling systems may be made based on which productivity ranking classification sub-group the client information handling system falls into. Similarly, the intelligent energy management system and power policy engine may determine application of power policy based on productivity index rankings for specific component device productivity levels as compared to productivity index rankings applied to entire client information handling systems.

Figure 10:
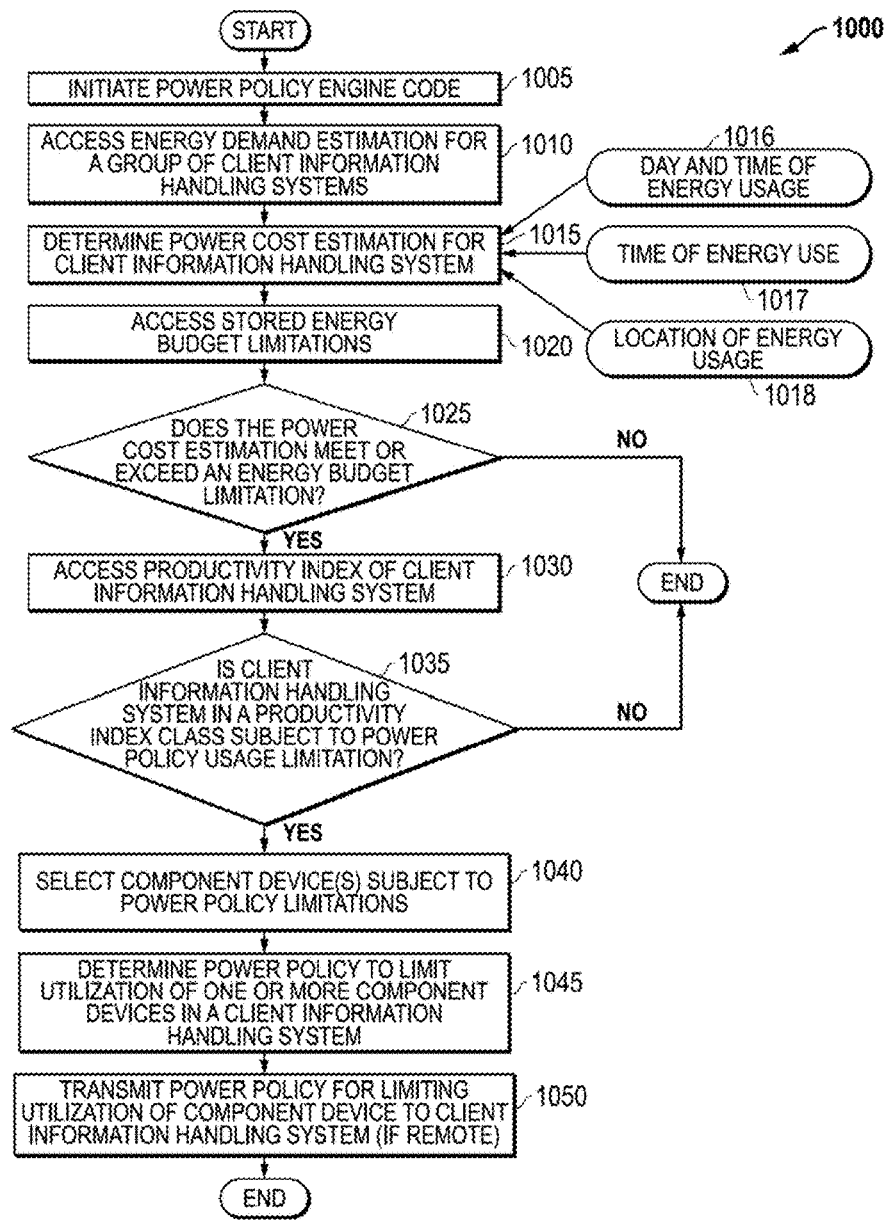
FIG. 10 is a flow diagram illustrating a method for determining power policy via an intelligent energy management system according to an embodiment of the present disclosure.

FIG. 10 shows a method 1000 for setting power policy for control of power consumption by enterprise client information handling systems via an intelligent energy management system according to an embodiment. The power policy for client information handling systems may be based on estimated energy demand for client information handling systems drawn from component utilization data received from across a plurality of client information handling systems associated with a group or enterprise. The method begins at block 1005, where the host system may initiate the intelligent energy management system code on the host device or remote data server if not already initiated. As part of this intelligent energy management system, a power policy engine and a productivity index generator may be initiated. As described above, component device utilization data including power consumption data may be accessed from a hardware implementation monitoring and reporting system which monitors client information handling systems in the group or enterprise.

At block 1010, the intelligent energy management system code will access current component device utilization data stored in the monitoring system data repository, including component device power consumption data for the plurality of monitored client information handling systems. With this data, the intelligent energy management system will conduct energy demand estimation for the group or enterprise of client information handling systems in accordance with embodiments described above. Statistical modeling from the monitored component device utilization data may be set to yield various views of energy demand estimation for IT managers to predict or plan enterprise energy consumption or budgets with reasonable certainty.

Proceeding to block 1015, the intelligent energy management system will draw data from relevant time periods selected as a power demand estimation calculation parameter. The intelligent energy management system will determine a power cost estimation for one or more client information handling systems within the group or enterprise. Factors used to determine the power cost estimation include selecting a plurality or time periods or selecting time-series data for energy usage 1016, costs of power during the time of day of expected energy usage 1017, and costs of power relevant to the location of the client information handling system 1018. The costs of power vary over the course of a typical day and may be set by power utilities at higher rates during peak power usage times. Assessment of the varying power costs over the course or a day, week, month, or season will yield more precise power cost estimation as well during future power cost estimation periods. Moreover, in a group or enterprise having multiple locations, power costs will vary between locations. The latter factor will be require location tracking or location prediction trends for client information handling systems to predict power cost estimations more precisely.

Flow proceeds to block 1020 where the intelligent energy management system accesses database information relating to energy budget limitations. The above described embodiments provide for power demand estimations that are accurate and useful for IT departments managing a group or enterprise. Based on these power demand estimations, better information is available to IT departments to determine energy budget limitations. The intelligent energy management system allows energy budget limitation settings to be made by user interface or other data input. For example, energy budget limitations may be established for specific time periods of operation such as expected peak usage periods. In other embodiments, the energy budget limitation may be set as a maximum power cost limit accrued over several hours or operation, for a day of the week, or over the course of several days in a week. In an example embodiment, the energy budget limitations may be customized with respect to productivity index classes of client information handling systems. In another embodiment, the energy budget limitations may be specific to enterprise locations, specific to component devices, or specific to other portions of the group or enterprise.

The flow proceeds to decision box 1025. At decision box 1025, the intelligent energy management system, via the power policy engine, may determine whether the power cost estimation for one or more client information handling systems in the enterprise will meet or exceed the energy budget limitations set in the intelligent energy management system. The energy budget limitations may be used to trigger power policy limitations with respect to client information handling systems within the group or enterprise when the power cost estimation level reaches or exceeds a corresponding energy budget limitation. The energy budget limitations may be set for selected time periods whereupon reaching or exceeding an estimated power cost level during the time period will trigger power policies to be implemented during the upcoming time period. In other aspects, time-series power demand estimations for the enterprise client information handling systems may reveal peak demand periods. Those peak demand periods may be matched to energy budget limits. When the budget limits are met or exceeded, power policies may then trigger after that point in time for the period of peak energy usage within the enterprise or group. Additionally, the energy budget limitations may be set individually for one or more client information handling systems in some aspects. In an aspect, power policy implementation may be triggered by either enterprise power cost estimations reaching an enterprise energy budget, or by individual client information handling system power cost estimations reaching an energy budget limitation for that client information handling system. It is also understood that any subset of client information handling systems in the enterprise may be the basis of both power cost estimations and energy budget limitations. If no power cost estimation level reaches or exceeds an energy budget limitation the method may end. It is understood that the intelligent energy management system may continue to monitor estimated energy demand and update power cost estimations and energy budget limitations such that the power policy engine may again be triggered in accordance with embodiments herein.

If a power cost estimation level does meet or exceed an energy budget limitation, then flow proceeds to block 1030. In an aspect of the present disclosure, the intelligent energy management system may assess the productivity index for one or more enterprise client information handling systems. The productivity index assessment may be made in accordance with embodiments described above. The productivity index assessment may be used, as described in those embodiments, to classify the client information handling systems into productivity index classes. A productivity index assessment may also be weighted or affected for client information handling systems according to business factors and considerations of project critical or user critical operations as described in embodiments herein. Upon determination of productivity index assessment of a client information handling system, flow proceeds to decision block 1035.

At decision block 1035, the power policy engine may assess the productivity index for one or more client information handling systems and determine if power policy is established for the productivity index class. If a client information handling system is not subject to power policy limitation by the power policy engine, the flow ends.

If, however, power policy does apply to a client information handling system having a productivity index class, then flow proceeds to block 1040. At block 1040, the power policy engine selects one or more component devices for application of a power policy usage limitation. The selection of the component devices for limitation may be preset by IT personnel in certain aspects. In other aspects, as described further below, selection of component devices may be made based on component device usage patterns or based on configuration of the client information handling system. In yet other aspects, a productivity index may be determined for various component devices within one or more client information handling systems. Selection of a component device for usage limitation may be based on productivity index of the component devices. In doing so, the intelligent energy management system may select power policy implementation to yield power savings that will not limit or more minimally limit productivity by selecting component devices less critical to a user's productivity and utilization on a client information handling system. In accordance with other embodiments, a system power state, such as ACPI system power states, may be selected by the power policy engine as usage limitations at block 1040. In such an example, selection of system power states may impact several component device systems of the client information handling system such as processor and display devices. System power state implementation, including ACPI global states, ACPI device states, ACPI processor states, or ACPI performance states may be implemented by the power policy engine. With improved prediction of power consumption within an enterprise, selection of these system power states will be determined based on the power cost estimations or energy demand estimations. The intelligent energy management system provides for implementation of power policy to mitigate energy usage during predicted times of energy demand by client information handling systems.

Proceeding to block 1045, the power policy engine applies settings for limiting usage of the selected component devices in the client information handling system and establishes power policy instructions in accordance with the usage limitations. At block 1050, if the client information handling system subject to power policy limitation is remote from the power policy engine of the intelligent energy management system, the power policy instructions are transmitted to the recipient enterprise client information handling system via a network interface device. For example, the intelligent energy management system with the power policy engine may be hosted by a centralized server and transmission of power policy instructions may be made to one or more enterprise client information handling systems. In other aspects, the intelligent energy management system may be hosted on one or more client information handling systems and may transmit power policy instructions to other recipient enterprise client information handling system subject to component device usage limitations by power policy. In other aspects, the intelligent energy management system may be hosted on the client information handling system subject to the power policy instructions, in which case, no transmission of instructions via a network interface would be necessary.

It is understood that the steps of the above-described method may occur in any order and that some steps may not be performed in all aspects of the present embodiments. For example, no productivity indices need to be assessed and power policy may be determined based on determination of whether energy budget limitations will be met or exceeded. In another example, the power policy engine my select a power policy based simply on productivity index classification of client information handling systems. In other example embodiments, the power policy engine may only assess the productivity indices for one or more component device types and apply power policy instructions according to type of component device. It is understood that additional method steps may also be included or substituted for those recited above with respect to FIG. 10 and in any order according to varying aspects of the present embodiments.

Figure 11A:
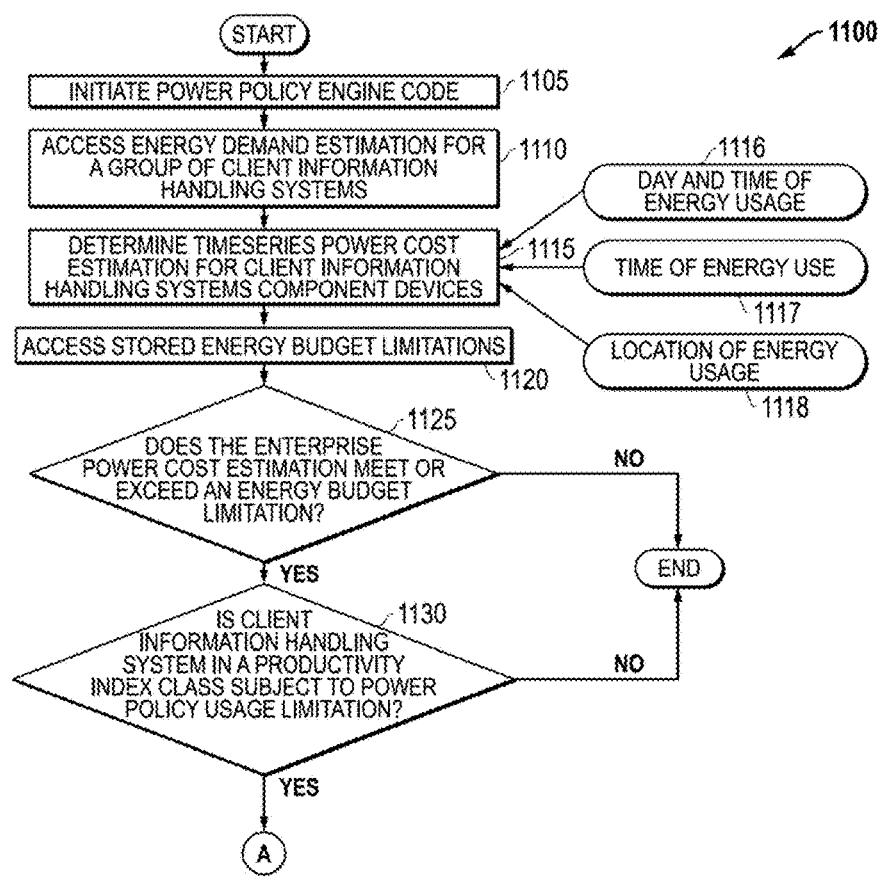
FIGS. 11A and 11B are flow diagrams illustrating another method for determining power policy via an intelligent energy management system according to an embodiment of the present disclosure.
Figure 11B:
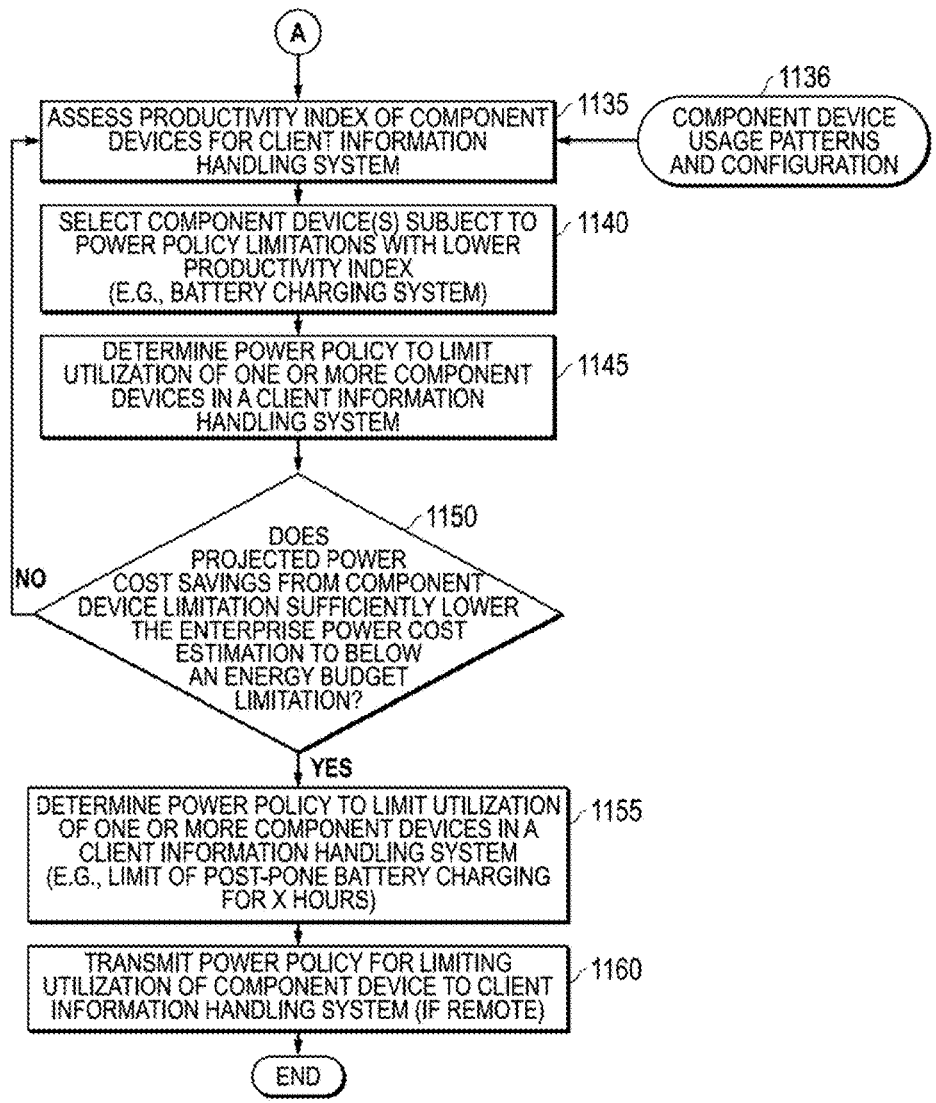

FIGS. 11A and 11B shows another method 1100 for setting power policy for control of power consumption by enterprise client information handling systems. The method begins at block 1105, where the host system may initiate a power policy engine and a productivity index generator of the intelligent energy management system code if not already initiated. Further, component device utilization data, including power consumption data and component device usage patterns and system configurations, may be accessed from a hardware implementation monitoring and reporting system for client information handling systems in the group or enterprise.

At block 1110, the intelligent energy management system code will conduct energy demand estimation for the enterprise client information handling systems in accordance with embodiments described above. With the component device utilization data, including power draw data, statistical modeling may yield various views of energy demand estimation within the enterprise.

Proceeding to block 1115, the intelligent energy management system will draw power demand estimation data from relevant time periods 1116. Accordingly, the intelligent energy management system will determine a power cost estimation for one or more client information handling systems within the group or enterprise at block 1115. In one aspect, the power cost estimation may include time series data. As above, time and day of energy usage 1016, costs of power during the time of day of expected energy usage 1017, and costs of power relevant to the location of the client information handling system 1018. Such factors account for variation in the costs of power over the course of a typical day or at diverse locations.

Flow proceeds to block 1120 where the intelligent energy management system accesses database information relating to energy budget limitations. Energy budget limitation settings may be made by user interface or other data input within the intelligent energy management system. The energy budget limitations may be customized. Energy budget limitation may be set to specifically apply to a productivity index class of client information handling systems, to particular enterprise locations, or to specific component device types. Many various customization details are contemplated with respect to client information handling systems within an group or enterprise. The energy budget limitations may also be established for specific time periods of operation based on daily or weekly rhythms of operation within the group or enterprise. In some embodiments, the energy budget limitation may be set as a maximum power cost limit to be accrued for a time period. The time period may be of any duration such as hours, a day, or over the course of several days in a week. Energy budget limitations may also be customized with respect to individual client information handling systems within the group or enterprise.

The flow proceeds to decision box 1125. At decision box 1125, the power policy engine may determine whether the power cost estimation for one or more client information handling systems in the enterprise will meet or exceed the energy budget limitations. Power policy limitations may be triggered with respect to client information handling systems within the group or enterprise when the power cost estimation level for an anticipated time period reaches or exceeds a corresponding energy budget limitation. In other aspects, time-series power demand estimations or power cost estimations for the enterprise client information handling systems to reveal peak demand periods which may be matched with energy budget limits. Thus, after the point in time when power cost actually meets or exceeds energy budget limits, then power policies established by the power policy engine may be triggered.

Power policy limiting usage may be triggered in individual client information handling systems by either enterprise power cost estimations reaching an enterprise energy budget or by individual client information handling system power cost estimations reaching an energy budget limitation for that client information handling system. It is also understood that any subset of client information handling systems in the enterprise may be the basis of both power cost estimations and energy budget limitations. In one example, subsets of client information handling systems may be assessed for estimated power costs and energy budget limitations according to classes of productivity index rankings to trigger power policy implementation. If no power cost estimation level reaches or exceeds an energy budget limitation the method may end. It is understood that the intelligent energy management system may continue to monitor estimated energy demand and update power cost estimations and energy budget limitations such that the power policy engine may again be triggered in accordance with embodiments herein.

If a power cost estimation level does meet or exceed an energy budget limitation, then flow proceeds to decision block 1130. In an aspect of the present disclosure, the intelligent energy management system may assess the productivity index for one or more enterprise client information handling systems. The productivity index assessment may be made in accordance with embodiments described above. The productivity index assessment may be used, as described in those embodiments, to classify the client information handling systems into productivity index classes. At decision block 1130, the power policy engine may assess the productivity index for one or more client information handling systems and determine if power policy is established to limit usage within the productivity index class. If a client information handling system is not subject to power policy limitation by the power policy engine, the flow ends.

If power policy does apply to a client information handling system productivity index class, then flow proceeds to block 1135. At block 1135, the intelligent energy management system may determine productivity index ratings for specific component devices within a client information handling system subject to power policy limitations on usage. In this block, the power policy engine may determine the productivity indices for specific component devices in the client information handling system based on component device usage patterns 1136 recorded by the hardware implementation monitoring and reporting system. Additionally, business factors may also influence component device productivity indices. For example, if a client information handling system subject to power policy limitation is designated for greater use of certain component devices with a mission critical project, the productivity index for those component devices may be weighted more highly to reduce application of power policy limitations to those component devices. In this way, the power policy engine may select power policy limitations while also minimizing reduction in productivity of operations of individual enterprise client information handling systems. The power policy engine may also be set to prohibit or restrict application of power policy limitations over certain component devices within a client information handling system. Prohibitions or restrictions on component devices' power usage may also depend on usage trends of the client information handling system and overall business factors as set by IT department personnel in certain aspects.

Flow proceeds to block 1140, where the power policy engine selects one or more component devices with lower productivity indices for application of power policy usage limitations. In an aspect, the intelligent energy management system power policy engine may select power policy implementation to yield power savings that will not limit or will minimally limit productivity by selecting component devices less critical to a user's productivity and utilization on a client information handling system. In an example embodiment, a battery charging system may have a lower productivity index value than other component devices. Limiting utilization of the battery charging system may have little or no impact on a user's productivity with a client information handling system. In some aspects, the productivity index value of the battery charging system may be impacted by measurement of battery power levels detected. In other aspects of the present example, a battery charging system productivity index may be affected by business factors such as important mobile operations. Thus, a battery charging system may need to be at a high productivity index to remain unhindered by a power policy. In yet other aspects however, battery charging may be limited during anticipated times of peak power usage. For example, slower speed power charging may only be allowed, battery charging may be limited by detected battery charge levels, or battery charging may be prohibited until a later anticipated off-peak power consumption time. In other examples, a client information handling system may not be at an enterprise location tending to reach an energy budget limitation, and thus there is no need to limit power usage by the battery charging system.

Proceeding to block 1145, the intelligent energy management system may determine time series power cost estimations for one or more component devices within the client information handling systems. In an example embodiment, the intelligent energy management system may determine power cost estimations for component device types across an enterprise or sub-groups within an enterprise. In other aspects, however, the intelligent energy management system may determine power cost estimations for one or more component devices in a specific client information handling system. In the latter aspect, more specific power policy may tailored to the client information handling systems.

At decision block 1150, the power policy engine may determine whether the cost savings from placing limitations or prohibitions on a component device in a plurality of enterprise client information handling systems will sufficiently lower power cost estimation to fall below an energy budget limitation amount. As stated above for block 1145, assessment of the power policy implementation and power cost savings may be particular to each enterprise client information handling system or may be applied across some or all of the enterprise client information handling systems. If power cost savings from implementation of the power policy is not enough to lower the estimate power cost, then the flow proceeds back to block 1135 to assess additional component device productivity indices. This is done to determine another lower productivity indexed component device as a candidate for usage limitation under power policy.

If the projected power policy cost savings for application of usage limitations will sufficiently lower projected power costs below energy budget limitations then flow proceeds to block 1155. The power policy engine applies settings for limiting usage of the selected component devices in the client information handling system and establishes power policy instructions in accordance with the usage limitations at block 1155. In an example embodiment, power policy may restrict battery charging system to a slow charge operation or to only charge battery to a set battery power level during times where enterprise power usage exceeds or is anticipated to exceed energy budget limitations. In another embodiment, battery charging may be postponed until a later time after an estimated peak power consumption period that may meet or exceed energy budget limitation. In other embodiments, client information handling systems may be set to enter reduced power states such as the ACPI power states for the client information handling system, processor, or other system components. In yet other embodiments, a display component device may be scheduled to dim or sleep more quickly during estimated peak power consumption periods. Other examples of power savings measures with respect to one or more component devices within the enterprise client information handling systems are also contemplated.

At block 1160, if the client information handling system subject to power policy limitation is remote from the power policy engine of the intelligent energy management system, the power policy instructions are transmitted to the recipient enterprise client information handling system via a network interface device. According to aspects of the present disclosure, the intelligent energy management system with the power policy engine may be hosted by a centralized server. Transmission of power policy instructions may be made to one or more enterprise client information handling systems via network interface connections. In other aspects, the intelligent energy management system may be hosted on one or more client information handling systems and may transmit power policy instructions to other recipient enterprise client information handling system subject to power policy limitation. In other aspects, the intelligent energy management system may be hosted on the client information handling system subject to the power policy instructions, in which case, no transmission of instructions via a network interface would be necessary.

It is understood that the steps of the above-described method may occur in any order and that some steps may not be performed in all aspects. It also is understood that additional method steps may also be included or substituted for those recited above with respect to FIGS. 11A and 11B in any order in various aspects of the present embodiments.

Figure 12:
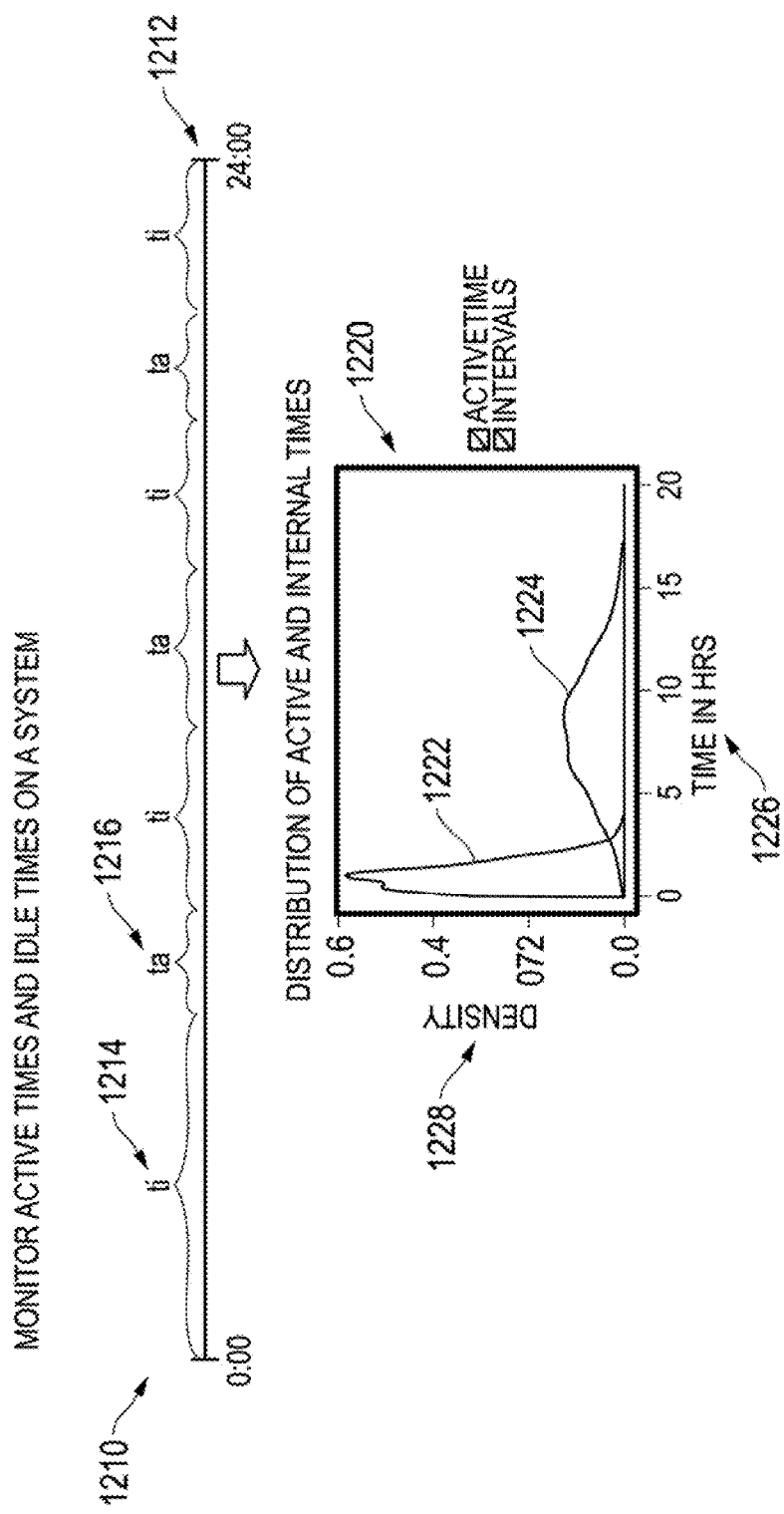
FIG. 12 are example graphical charts illustrating aspects of component device utilization data of one or more client information handling systems according to an embodiment of the present disclosure.

FIG. 12 shows example data 1210 relating to active times and intervals between active times for one or more client information handling systems measured by a hardware implementation monitoring and reporting system. In one aspect, timeline 1212 illustrates measured active times and interval times. The timeline 1212 is over the course of 24:00 hours in the present embodiment but may be of any time. Monitored usage patterns of a client information handling system will show periods of inactivity as intervals between active times ($t_i$) 1214 and active event times ($t_a$) 1216. Each of active event times ($t_a$) 1216 and intervals between active times ($t_i$) 1214 are examples of activity for a client information handling system. The shown timeline data 1210 are merely exemplary data for the purpose of illustration of the present disclosure.

Graphic 1220 shows a distribution of active event times and interval times by duration. Again, the shown graphical data are merely exemplary data for the purpose of illustration of the present disclosure. Curve 1222 shows an exemplary distribution of active event time ($t_a$) durations. The duration time in hours is shown at axis 1226 and the density of active event times at those durations is shown along axis 1228. Curve 1224 illustrates an exemplary distribution of intervals between active event times ($t_i$). It is noted that often intervals between active event times may be long due to, for example, night time dormancy of client information handling systems or periods of non-use during the day due to other duties of users. Duration of active event times ($t_a$) may be shorter reflecting typical use of some client information handling systems. Such active event time durations and intervals between active event times may be gathered by a hardware implementation monitoring and reporting system agent on client information handling systems and reported back with component device utilization data. Active event time ($t_a$) and intervals ($t_i$) may be monitored with respect to overall activity of enterprise client information handling systems in some aspects. In other aspects, the hardware implementation monitoring and reporting system may collect active event times ($t_a$) and intervals ($t_i$) for individual component devices or for sub-groups of component devices.

Currently IT management may determine a policy for all client information handing systems with respect to system power saving measures. IT personnel may interface with a system user interface on individual client information handling systems or a control system to establish settings for control over power settings for all client information handling systems in an enterprise or group of computers. Some current methods may determine whether a client information handling system is plugged in and provide alternate policies to client information handling systems. However, current systems for IT management power settings do not monitor and assess active event time durations ($t_a$) or intervals ($t_i$) as well as the other device utilization data of the present disclosure. With the collection of the above described component device utilization data including active event times, intervals, and power consumption data for component devices, an estimate may be made of energy usage by enterprise client information handling systems. Both productivity and energy usage estimation may be made with reasonably high confidence using the intelligent energy management system of the present disclosure. With such confident estimation capabilities, more intelligent and tailored power policies may be implemented via the intelligent energy management system.

Figure 13:
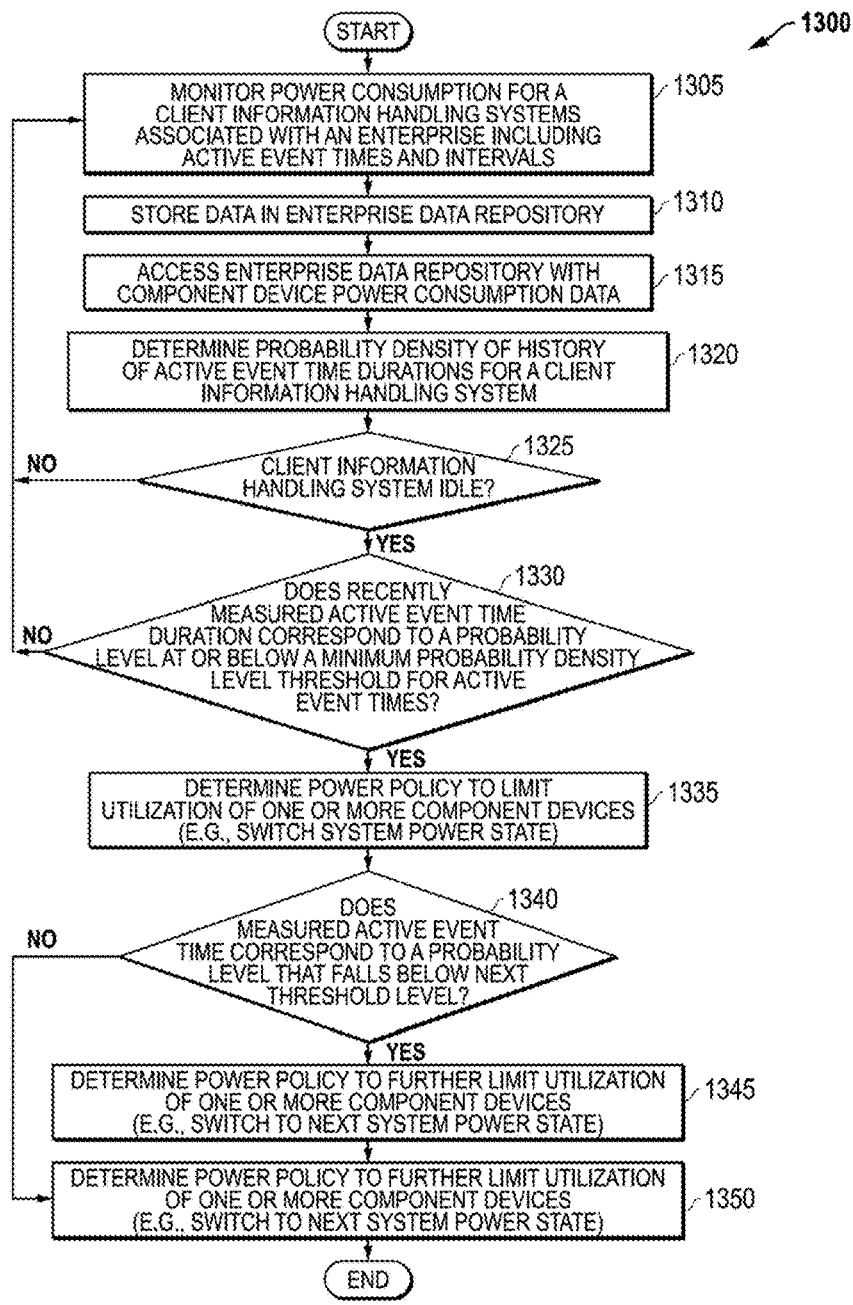
FIG. 13 is a flow chart illustrating another method for determining power policy via an intelligent energy management system according to an embodiment of the present disclosure.

FIG. 13 shows a method 1300 for setting power policy for control of power consumption by enterprise client information handling systems using active event times and intervals between active event times according to an embodiment of the present disclosure. The method begins at block 1305, where the host system may receive component device utilization data from a client information handling system including active event time durations ($t_a$) and intervals between active event times ($t_i$). A hardware implementation monitoring and reporting system agent may record activity of component devices on the client information handling system and report back to a centralized hub. At 1310, the component device utilization data, including the active event time durations ($t_a$) and intervals ($t_i$) for the overall system and for component devices, is stored at an enterprise data repository.

At block 1315, the intelligent energy management system may access the enterprise data repository with component device power consumption data and active event time durations ($t_a$) or intervals ($t_i$) for the client information handling system or component devices. The intelligent energy management system will determine probability densities for active event time durations ($t_a$) or intervals ($t_i$). By associating probability levels having reasonably high confidence levels that correspond with the active event time durations or intervals, current measured active event time durations ($t_a$) or intervals ($t_i$) may be used to predict future activity of a client information handling system or component devices of the same. This future activity probability may be utilized by a power policy engine to implement power policies to limit usage and power consumption by the client information handling system. The correlation of probability density function to active event time durations ($t_a$) or intervals ($t_i$) is based on historical data gathered from an enterprise client information handling system or group of systems and is useful in predicting the future activity and, accordingly, power consumption. In some aspects, a productivity index generator of the intelligent energy management system code may also be used to assign probability index assessments to client information handling systems or component devices to assist in determining power policy.

At decision block 1325, the intelligent energy management system code will determine if the client information handling system is currently idle in some aspects. A hardware implementation and monitoring system may report that the system has been idle beyond a threshold time in an example embodiment. If the client information handling system is not determined to be idle for a sufficient period of time, the flow returns to block 1305 where the intelligent energy management system continues to receive monitored consumption and component device utilization data from client information handling systems.

If the intelligent energy management system determines that a client information handling system is idle for a sufficient amount of time, flow proceeds to decision block 1330. At decision block 1330, the intelligent energy management system, through its power policy engine in an example aspect, may compare a recently measured active event time duration ($t_a$) with a probability density function to determine a corresponding probability that an active event time has ended in duration. If, for example, 99% of all active event times have a duration at or shorter than a recently measured active event time durations ($t_a$), then a period of a reasonably substantial interval between active event times ($t_i$) may be anticipated to follow. Another way of assessing probability includes whether the corresponding probability density of an active event time duration falls below a certain level. As shown above the distribution illustrated in FIG. 12 at 1222, most active event times for the client information handling system are of a shorter duration and longer duration active event times have a lower probability density value. In such a case, if the probability density level above falls below a certain threshold, this may trigger the power policy engine to initiate implementation of a power policy. As can be seen from the probability density curve for active event times ($t_a$) 1222 in FIG. 12, a minimum duration of active event time may need to be reached before a probability density value falls below a corresponding level. Factors including time of day or location may also be included in determination that a reasonably substantial interval between active event times (t) is anticipated. Such factors may be assessed as well when determining that a probability density threshold has been reached. In an aspect, time of day or location factors may weight a probability density value of the active event time duration ($t_a$) to alter the likelihood a threshold has been reached. For example, if the time of day is at the end of a work day or late in the evening and if the location is not an enterprise work site, then this may increase the chances of an anticipated interval between active event times. Thus, at decision block 1330, if the measured active event time duration corresponds with a probability density level that is not below the threshold level, then flow returns to block 1305 for continued monitoring of client information handling systems.

If the probability density level is at or below a minimum probability threshold such that a threshold level of active event time durations would have likely been shorter than the measured duration, then flow proceeds to block 1335. The power policy engine applies settings for limiting usage of the selected component devices or switching to a new system power state in the client information handling system at block 1335. The power policy engine may establish power policy instructions in accordance with the usage limitations at block 1335 for implementation in the enterprise client information handling system. In an example embodiment, power policy may switch ACPI system power state. For example, the power policy engine may switch a system power state from G0/S0 to G1 or S1. In another example, the power policy engine may switch power states for a processor or other component device such as from D0 to D1 or C0 to C1. Other example usage restrictions or prohibitions may be applied to the use of one or more component devices in accordance with the disclosure herein. Other examples of power savings measures with respect to one or more component devices within the enterprise client information handling systems are contemplated also as triggered by assessment of active event time durations or interval of inactivity.

If a power policy is established at block 1335, flow may proceed to decision block 1340. At decision block 1340, the intelligent energy management system may determine whether a measured active event time duration falls below a second threshold probability density level to trigger additional power policy restrictions. If not, then flow may proceed to block 1350 to transmit the power policy to the client information handling system. The intelligent energy management system may also continue monitoring of client information handling systems in accordance with the present disclosure.

If a second threshold level is reached at decision block 1340, flow proceeds to block 1345 where an additional power policy use restriction may be initiated by the power policy engine. In an example embodiment, a next level of system power state may be triggered. For example, the client information handling system may be sent to an S2, S3 or S4 level or powered off. Similarly a processor or component device may also be switched to a lower intermediate power state, stop-clock mode, sleep mode, or the processor or component device may be powered off. The power policy engine may then apply settings for limiting usage of the selected component devices or switching to a new system power state, and may establish power policy instructions in accordance with the usage limitations.

At block 1350, if the client information handling system subject to power policy limitation is remote from the power policy engine of the intelligent energy management system, the power policy instructions are transmitted to the recipient enterprise client information handling system via a network interface device. In some aspects, some or all the intelligent energy management system may be hosted on a client information handling system such that transmission of power policy instructions may not be necessary.

It is understood that the steps of the above-described method may occur in any order and that some steps may not be performed in all aspects. It is understood that additional method steps may also be included or substituted for those recited above with respect to FIG. 13 and in any order in certain aspects of the present embodiments.

Figure 14A:
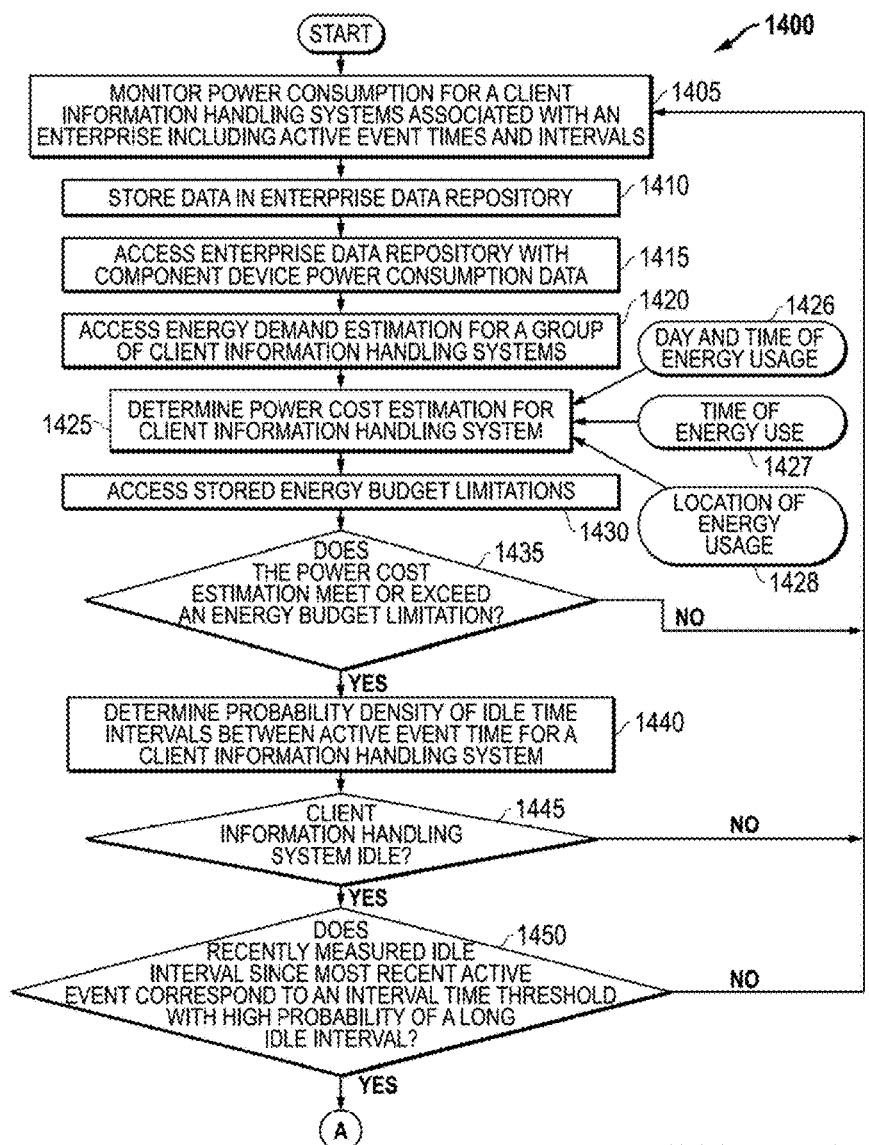
FIGS. 14A and 14B are yet another set of flow charts illustrating another method for determining power policy via an intelligent energy management system according to an embodiment of the present disclosure.
Figure 14B:
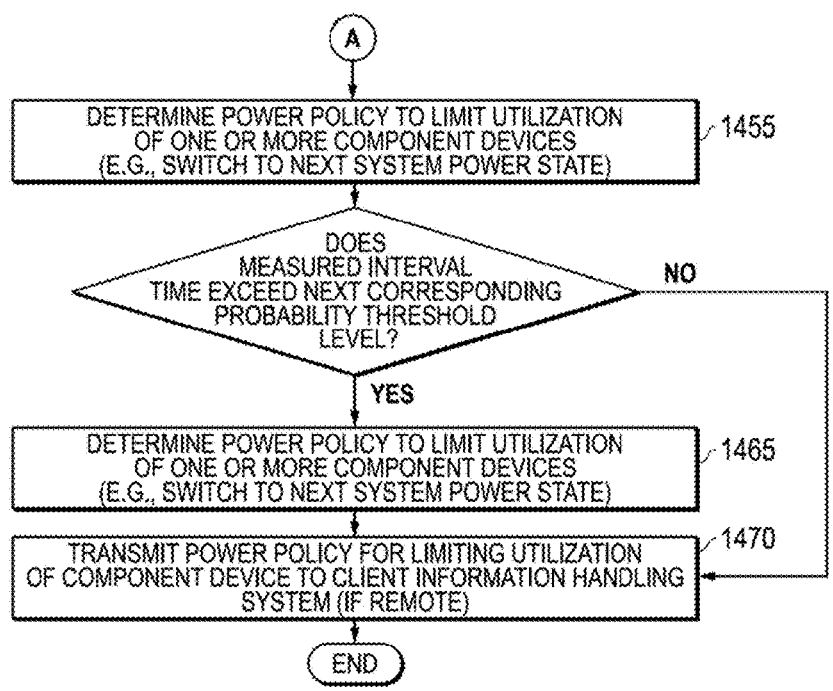

FIGS. 14A and 14B show yet another example method 1400 for setting power policy for control of power consumption by enterprise client information handling systems with active event times and intervals between active event times according to an embodiment of the present disclosure. In an example embodiment, several aspects of energy demand estimation and trends in activity for client information handling systems described in the present disclosure may be used together to determine power policy via the intelligent energy management system with power policy engine.

The method begins at block 1405, where the host system may receive component device utilization data from a client information handling system including active event time durations ($t_a$), intervals between active event times ($t_i$), and power consumption date for component devices. As described herein, a hardware implementation monitoring and reporting system agent may record activity of component devices and intelligent energy management system agents may record power consumption data by component devices on the client information handling system. This component device utilization data may be reported back to a centralized enterprise data repository at 1410.

Proceeding to block 1415, the intelligent energy management system may access the enterprise data repository with component device power consumption data and active event time durations ($t_a$) or intervals ($t_i$) for the client information handling system or for one or more component devices. At block 1420, the intelligent energy management system will determine energy demand estimations based on previously recorded power consumption measurements for enterprise client information handling systems. As with previous embodiments, the intelligent energy management system will determine power cost estimations from power demand estimation, day and time of energy usage 1426, cost of energy use during time periods 1427, and cost of energy usage at locations 1428. At 1430, the intelligent energy management system will access stored budget limitations. Proceeding to decision block 1435, the intelligent energy management system will determine whether the power cost estimations meet or exceed the energy budget limitations for a time period. If not, the flow proceeds back to block 1405 for continued monitoring of the enterprise client information handling system or systems. If energy budget limitations are met or exceeded, the flow proceeds to block 1440.

At 1440, the intelligent energy management system determines probability densities for intervals between active event times ($t_i$). In other aspects it is understood that active event time durations ($t_a$) may be assessed for probability densities and used in place of intervals. The current embodiment utilizes intervals between active event times ($t_i$). By associating probability levels having reasonably high confidence levels that correspond with the intervals between active event times ($t_i$), current measured intervals between active event times ($t_i$) may be used to predict future inactivity of a client information handling system or component devices of the same.

Proceeding to decision block 1445, the intelligent energy management system assesses whether a client information handling system has been idle for a sufficient amount of time. If not, flow may return to block 1405 for continued monitoring of the client information handling system. If the client information handling system is detected to be inactive for a sufficient amount of time at decision block 1445, flow proceeds to decision block 1450 to determine if an interval between active event times has been long enough to meet a probability density threshold level.

At decision block 1450, a probability density for intervals between active event times ($t_i$) may typically be a more spread out probability density distribution as shown in FIG. 12 at 1224. Thus, the intelligent energy management system may determine that if a probability density corresponding to an ongoing measured interval duration ($t_i$) is sufficiently large, then a long idle interval is anticipated and a power policy may be set accordingly. If a threshold level for a probability density for intervals between active event times ($t_i$) has not been met at decision block 1450, flow may return to block 1405 for continued monitoring by the intelligent energy management system and hardware implementation monitoring system. In another example aspect, a threshold probability density may determine probability of future activity after a measured interval of inactivity. For example, if a client information handling system has been idle for a measured period of time, the intelligent energy management system may assess the probability of future activity based on probability density for intervals between active times for the measured time interval plus additional time. The probability that the client information handling system or component device will be active again at the measured idle time plus another amount of time (seconds, minutes, hours, etc.) will be assessed against a probability density threshold level. If the probability of future activity beyond the measured idle time is below a threshold level, this may trigger implementation of power policy for the client information handling system.

If at decision block 1450 a threshold level for a probability density for intervals between active event times ($t_i$) has been met, then flow may proceed to block 1455. At block 1455, the power policy engine may determine a power policy to limit utilization of one or more component devices or to switch power states for a client information handling system. The power policy may be established in accordance with a variety of power savings measures such as those described in embodiments herein. If a power policy is established at block 1455, flow may proceed to decision block 1460 where the intelligent energy management system may determine whether a measured interval between active event times reaches a second threshold level to trigger additional power policy restrictions. If not, then flow may proceed to block 1470 to transmit the power policy to the client information handling system. The intelligent energy management system may also continue monitoring of client information handling systems in accordance with the present disclosure.

If a second threshold level is reached at decision block 1460, flow proceeds to block 1465 where an additional power policy use restriction may be initiated by the power policy engine. In an example embodiment, another component devices, such as a lower productivity indexed component device, may be limited or prohibited from use by power policy. In another example embodiment, a next level of system power state may be triggered. The power policy engine may then apply settings for limiting usage of the selected component devices or switching to the new system power state based on anticipated long duration of the current interval between active event times. The power policy engine may thus establish power policy instructions in accordance with the usage limitations. A variety of power savings measures may be implemented in power policies including prohibitions or limitations of function for selected component devices or triggering power states with client information handling systems. The power policies may be determined based upon component device utilization data, productivity, and estimated energy demands by the client system or the enterprise.

At block 1470, if the client information handling system subject to power policy limitation is remote from the power policy engine of the intelligent energy management system, the power policy instructions are transmitted to the recipient enterprise client information handling system via a network interface device.

It is understood that the steps of the above-described method may occur in any order and that some steps may not be performed in all aspects. It is understood that additional method steps may also be included or substituted for those recited above with respect to FIG. 13 and in any order in certain aspects of the present embodiments.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   an application processor executing instructions for an intelligent energy management system to determine energy demand estimation for a group of client information handling systems based on component device utilization data from at least a portion of the group of client information handling systems;
   a power policy engine determining, via the application processor, a timeseries power cost estimation for the group of client information handling systems, wherein the timeseries power cost estimation for the group of client information handling systems is based on the energy demand estimation, a day and time of energy usage, and an energy rate for the time and a location of energy usage;
   a memory device storing an energy budget limitation for the group of client information handling systems and a component device utilization data record associated with one of a plurality of component devices of a plurality of power policy controlled client information handling systems within the group of information handling systems;
   the power policy engine comparing the timeseries power cost estimation for the group of client information handling systems with the energy budget limitation;
   the power policy engine determining a power policy to limit utilization of the one of the plurality of component devices within the plurality of power policy controlled client information handling systems based on the component device utilization data record associated with the one of the plurality of component devices when the power cost estimation meets or exceeds the energy budget limitation; and
   a network interface device for transmitting the power policy to limit utilization of the one of the plurality of component devices within each of the plurality of power policy controlled client information handling systems to the plurality of power policy controlled client information handling system.

2. The system of claim 1, wherein the component device utilization data includes power consumption measurements for a plurality of component devices including component devices selected from a group including a CPU/chipset component, a GPU component, a battery charger component, a display component, or a network interface component.

3. The system of claim 1, wherein the power policy engine determines a power policy to limit utilization of a battery charger component for the power policy controlled client information handling system during a time period when power cost estimation of energy demand for the group of client information handling systems meets or exceeds the energy budget limitation.

4. The system of claim 3, wherein the power policy to limit utilization of a battery charger component includes limiting battery charging to a battery power level sufficient to accommodate future energy demand estimation levels for the power policy controlled client information handling system for a time period until power cost estimation of energy demand for the group of client information handling systems is projected to fall below the energy budget limitation.

5. The system of claim 1, wherein the component device utilization data associated with the at least one component device upon which the power policy engine selects the power policy to limit utilization of the at least one component device of the power policy controlled client information handling system includes a productivity index ranking of the at least one component device.

6. The system of claim 1, wherein the power policy engine determines the power policy to limit utilization of the at least one component device for a plurality of power policy controlled client information handling system.

7. The system of claim 6, wherein the power policy engine selects the plurality of power policy controlled client information handling systems subject to the power policy based on productivity index ranking classification of the selected plurality of power policy controlled client information handling systems.

8. The system of claim 7, wherein the power policy engine selects the plurality of power policy controlled client information handling systems subject to the power policy further based on application of a productivity index boundary to productivity index rankings.

9. A computer implemented method comprising:
   executing, via an application processor, instructions of an intelligent energy management system to determine energy demand estimation based on a component device utilization data record associated with one of a plurality of component devices of a plurality of power policy controlled client information handling systems within a group of client information handling systems received from at least a portion of the group of client information handling systems;

determining, via a power policy engine operating on the application processor, a power cost estimation for the group of client information handling systems, wherein the power cost estimation for the group of client information handling systems is based on the energy demand estimation, a day and time of energy usage, and an energy rate for the time and a location of energy usage;

comparing the power cost estimation with an energy budget limitation for the group of client information handling systems;

determining a power policy to limit utilization of the one of the plurality of component devices based on the component device utilization data record associated with the one of the plurality of component devices when the power cost estimation meets or exceeds the energy budget limitation; and transmitting, via a network interface device, the power policy to limit utilization of the one of the plurality of component devices to the plurality of power policy controlled client information handling systems.

10. The method of claim 9, wherein the component device utilization data includes power consumption measurements for a plurality of component devices including component devices selected from a group including a CPU/chipset component, a GPU component, a battery charger component, a display component, or a network interface component.

11. The method of claim 9 further comprising:
selecting the at least one component device limited under the power policy based on a productivity index ranking for the selected component device.

12. The method of claim 9, wherein the power policy engine determines the power policy to switch at least one power policy controlled client information handling system to a CPU power state other than the CPU operating state.

13. The method of claim 9 further comprising:
selecting the plurality of power policy controlled client information handling systems limited under the power policy based on a productivity index ranking class for the plurality of power policy controlled client information handling systems.

14. The method of claim 9, wherein the power cost estimation determined via the power policy engine is a time-series power cost estimation.

15. The method of claim 14, further comprising:
determining, via the power policy engine, a daily peak need timeframe from the time-series power cost estimation; and
determining a power policy to limit utilization of at least one component device of a plurality of power policy controlled client information handling systems during the daily peak need timeframe.

16. An information handling system comprising:
a network adapter for receiving component device utilization data from a group of client information handling systems in the enterprise including active event times and intervals between active event times for the group of client information handling systems;
a memory device for storing component device utilization data record associated with one of a plurality of component devices received from the group of client information handling systems;
a memory device storing a component device utilization data record associated with one of a plurality of component devices of a plurality of power policy controlled client information handling systems within the group of client information handling systems;
an application processor executing instructions of an intelligent energy management system for determining energy demands for an enterprise, wherein the application processor determines a probability density of active event times for the group of client information handling systems; and
a power policy engine determining, via an application processor, a power policy to switch a system power state based on a recently measured active event time for the power policy controlled client information handling systems, wherein the recently measured active event time is less than or equal to an active event time having a first minimum probability threshold level in the power density of active event times, and wherein switching the system power state includes limiting utilization of the one of the plurality of component devices of each of the power policy controlled client information handling systems based on the component device data record associated with the one of the plurality of component devices.

17. The system of claim 16, wherein the power policy engine determines the power policy to switch to a first system power state based on a recently measured active event time for the client information handling system, wherein the recently measured active event time is less than or equal to an active event time having a first minimum probability threshold level.

18. The system of claim 16, wherein the power policy engine further determines the power policy to switch to a second system power state based on the recently measured active event time for the client information handling system, wherein the recently measured active event time is less than or equal to an active event time having a second minimum probability threshold level greater than the first minimum probability threshold, and wherein the second system power state is to turn off a display of the client information handling system.

19. The system of claim 16, wherein the application processor determines a probability density of intervals between active event times for the client information handling systems, and wherein the power policy engine determines the power policy to switch to a second system power state based on a recently measured interval between active event times for the client information handling system exceeding a threshold level interval between active event times.

20. The system of claim 16, wherein the second system power state includes a sleep mode.

* * * * *